US012023920B2

(12) United States Patent
Sato et al.

(10) Patent No.: US 12,023,920 B2
(45) Date of Patent: Jul. 2, 2024

(54) RECORDING APPARATUS AND RECORDING METHOD

(71) Applicant: SEIKO EPSON CORPORATION, Tokyo (JP)

(72) Inventors: Akito Sato, Nagano (JP); Takuma Hayashi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 127 days.

(21) Appl. No.: 17/931,910

(22) Filed: Sep. 14, 2022

(65) Prior Publication Data

US 2023/0082484 A1 Mar. 16, 2023

(30) Foreign Application Priority Data

Sep. 16, 2021 (JP) ................................ 2021-150882

(51) Int. Cl.
*B41J 2/045* (2006.01)

(52) U.S. Cl.
CPC ....... *B41J 2/04503* (2013.01); *B41J 2/04586* (2013.01)

(58) Field of Classification Search
CPC .. B41J 2/04536; B41J 2/04586; B41J 2/2117; B41J 2/04503; B41J 19/207; B41J 2/15
See application file for complete search history.

(56) References Cited

U.S. PATENT DOCUMENTS

| | | | | |
|---|---|---|---|---|
| 2006/0158473 A1* | 7/2006 | Mills | B41J 11/0015 | 347/15 |
| 2006/0158481 A1* | 7/2006 | Spevak | B41J 2/2114 | 347/43 |
| 2007/0291059 A1 | 12/2007 | Hayashi et al. | | |
| 2012/0223994 A1 | 9/2012 | Yuda et al. | | |
| 2018/0339509 A1 | 11/2018 | Momose et al. | | |

FOREIGN PATENT DOCUMENTS

| | | |
|---|---|---|
| JP | 2008-023982 A | 2/2008 |
| JP | 2012-179884 A | 9/2012 |
| JP | 2018-199280 A | 12/2018 |

* cited by examiner

*Primary Examiner* — Thinh H Nguyen
(74) *Attorney, Agent, or Firm* — Global IP Counselors, LLP

(57) ABSTRACT

It is possible to perform formation of a first pattern, a second pattern, a third pattern and a fourth pattern, a control unit is configured to execute first control and second control or first control and third control, the first control of forming a first patch in which the first and third patterns are disposed without performing conveyance operation, the second control of forming a second patch in which the first and second patterns are disposed and a third patch in which the third and fourth patterns are disposed and the third control of forming a fourth patch in which the first and fourth patterns are disposed and a fifth patch in which the second and third patterns are disposed.

7 Claims, 12 Drawing Sheets

RECORDING APPARATUS AND RECORDING METHOD

The present application is based on, and claims priority from JP Application Serial Number 2021-150882, filed Sep. 16, 2021, the disclosure of which is hereby incorporated by reference herein in its entirety.

BACKGROUND

1. Technical Field

The present disclosure relates to a recording apparatus and a recording method.

2. Related Art

In the case where a recording head including a nozzle row in which a plurality of nozzles for ejecting ink are arranged is tilted in a direction intersecting the recording surface of a medium such as a sheet, i.e., it has a tilt called "bow", a positional displacement corresponding to the tilt is caused between the dot line ejected to the medium from the nozzle row in the forward movement of the recording head and the dot line ejected to the medium from the nozzle row in the backward movement of the recording head (see JP-A-2018-199280).

According to JP-A-2018-199280, the impinging position of the dot ejected from each nozzle is adjusted by generating an approximate straight line by reading the pattern image recorded by using all nozzles of the nozzle row through the forward movement of the recording head and the pattern image recorded by using all nozzles of the nozzle row through the backward movement of the recording head, and by deriving the above-described tilt from the approximate straight line.

There is a room for improvement in the pattern that is recorded for correcting the displacement of the impinging position of the dot due to the tilt of the recording head. In addition, there are factors of the displacement of the impinging position of the dot other than the tilt, and therefore it is required to record patterns that will help to correct the positional displacement due to each factor.

SUMMARY

A recording apparatus includes a recording head including a nozzle row in which a plurality of nozzles for ejecting ink to a medium are disposed side by side in a nozzle row direction, and a control unit configured to control ink ejection of the recording head. Recording on the medium is performed by a conveyance operation of relatively moving the recording head and the medium in a first direction, forward scanning that is ink ejection along with a forward movement of the recording head along a second direction intersecting the first direction, and backward scanning that is ink ejection along with a backward movement of the recording head along the second direction, the nozzle row includes, along the nozzle row direction, a first nozzle group, a second nozzle group, and a third nozzle group between the first nozzle group and the second nozzle group, the control unit is configured to control, in the forward scanning, formation of a first pattern on the medium through ink ejection from the first nozzle group, and formation of a second pattern on the medium through ink ejection from the second nozzle group, the control unit is configured to control, in the backward scanning, formation of a third pattern on the medium through ink ejection from the first nozzle group, and formation of a fourth pattern on the medium through ink ejection from the second nozzle group, the control unit is configured to execute a first control of forming a first patch on the medium without performing a conveyance operation, the first patch being a patch in which the first pattern and the third pattern are disposed at overlapping positions as viewed in the second direction, a second control of forming a second patch and a third patch on the medium, the second patch being a patch in which the first pattern and the second pattern are disposed at overlapping positions as viewed in the second direction, the third patch being a patch in which the third pattern and the fourth pattern are disposed at overlapping positions as viewed in the second direction, and a third control of forming a fourth patch and a fifth patch on the medium, the fourth patch being a patch in which the first pattern and the fourth pattern are disposed at overlapping positions as viewed in the second direction, the fifth patch being a patch in which the second pattern and the third pattern are disposed at overlapping positions as viewed in the second direction, and the first control and the second control, or the first control and the third control are executed by a single adjusting operation.

A recording method is a method of performing recording on a medium by a conveyance operation of relatively moving a recording head and the medium in a first direction, forward scanning that is ink ejection along with a forward movement of the recording head along a second direction intersecting the first direction, and backward scanning that is ink ejection along with a backward movement of the recording head along the second direction, the recording head including a nozzle row in which a plurality of nozzles for ejecting ink to the medium are disposed side by side in a nozzle row direction. The nozzle row includes, along the nozzle row direction, a first nozzle group, a second nozzle group, and a third nozzle group between the first nozzle group and the second nozzle group, and a first control and a second control, or the first control and a third control are executed by a single adjusting operation, provided that a pattern that is formed on the medium through ink ejection from the first nozzle group in the forward scanning is a first pattern, a pattern that is formed on the medium through ink ejection from the second nozzle group in the forward scanning is a second pattern, a pattern that is formed on the medium through the ink ejection from the first nozzle group in the backward scanning is a third pattern, and a pattern that is formed on the medium through the ink ejection from the second nozzle group in the backward scanning is a fourth pattern, and a control of forming a first patch on the medium without performing the conveyance operation is the first control, the first patch being a patch in which the first pattern and the third pattern are disposed at overlapping positions as viewed in the second direction, a control of forming a second patch and a third patch on the medium is the second control, the second patch being a patch in which the first pattern and the second pattern are disposed at overlapping positions as viewed in the second direction, the third patch being a patch in which the third pattern and the fourth pattern are disposed at overlapping positions as viewed in the second direction, and a control of forming a fourth patch and a fifth patch on the medium is the third control, the fourth patch being a patch in which the first pattern and the fourth pattern are disposed at overlapping positions as viewed in the second direction, the fifth patch being a patch in which the second pattern and the third pattern are disposed at overlapping positions as viewed in the second direction.

DESCRIPTION OF EXEMPLARY EMBODIMENTS

Embodiments of the present disclosure will be described below with reference to the accompanying drawings. Note that each of the drawings is merely an example for describing the embodiments. Since the drawings are examples, they may be provided with incorrect proportions and shapes, may mismatch each other, and may be partially omitted.

1. Outline Description of Apparatus

Figure 1:
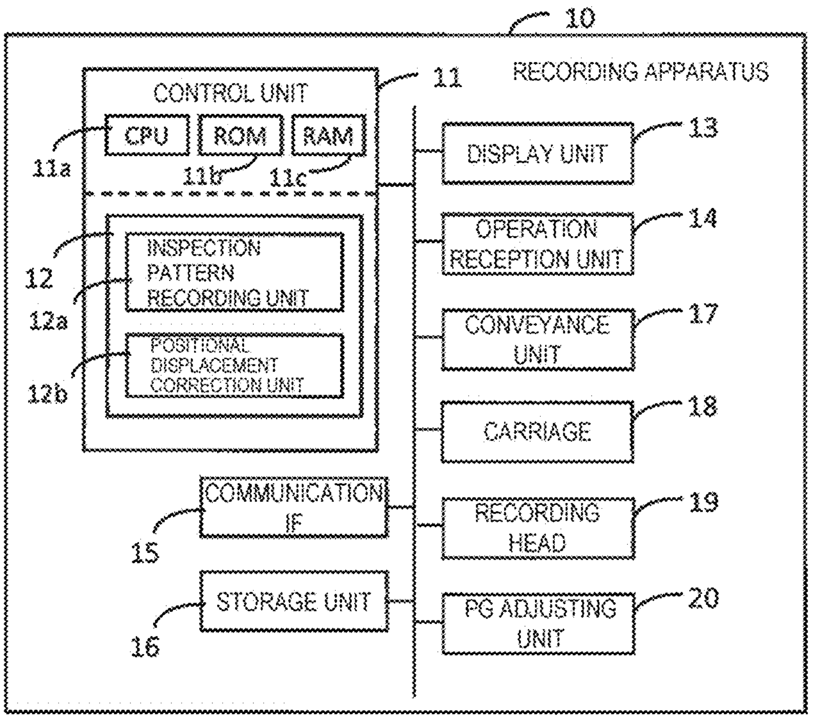
FIG. 1 is a block diagram schematically illustrating a device configuration according to an embodiment.

FIG. 1 schematically illustrates a configuration of a recording apparatus 10 according to the embodiment. The recording apparatus 10 includes a control unit 11, a display unit 13, an operation reception unit 14, a communication IF 15, a storage unit 16, a conveyance unit 17, a carriage 18, a recording head 19, a PG adjusting unit 20 and the like. IF is an abbreviation of interface. PG is an abbreviation of paper gap, and means a distance between a medium and the recording head. Note that the PG adjusting unit 20 may be omitted except in the "fourth modification" described later. With the recording apparatus 10, a recording method is achieved.

The control unit 11 includes one or a plurality of ICs including a CPU 11*a* serving as a processor, a ROM 11*b*, a RAM 11*c* and the like, other nonvolatile memories and the like. At the control unit 11, the processor, i.e., the CPU 11*a*, executes arithmetic processing in accordance with a program 12 stored in the ROM 11*b*, other memories and the like, with the RAM 11*c* and the like used as a working area. In accordance with the program 12, the control unit 11 implements a plurality of functions such as an inspection pattern recording unit 12*a* and a positional displacement correction unit 12*b*. Note that the processor is not limited to one CPU, and may have a configuration of performing processing with a plurality of CPUs or a hardware circuit such as an ASIC, or a configuration of performing processing with a CPU and a hardware circuit in conjunction with each other.

The display unit 13 is a means for displaying visual information, and is composed of a liquid crystal display, an organic EL display or the like, for example. The display unit 13 may have a configuration including a display and a driving circuit for driving the display. The operation reception unit 14 is a means for receiving the user operation, and is implemented with physical buttons, touch panel, mouse, keyboard and the like, for example. Naturally, the touch panel may be implemented as one function of the display unit 13. A configuration including the display unit 13 and the operation reception unit 14 may be referred to as the operation panel of the recording apparatus 10.

The display unit 13 and/or the operation reception unit 14 may be a part of the configuration of the recording apparatus 10, or may be a peripheral device externally attached to the recording apparatus 10.

The communication IF 15 is a collective term of one or a plurality of IFs for the recording apparatus 10 to communicate with the outside in a wired or wireless manner in compliance with a predetermined communication protocol including publicly known communication standards. The control unit 11 can communicate with a personal computer, a server, a smartphone, a tablet terminal and the like not illustrated in the drawing through the communication IF 15, for example.

The storage unit 16 is a storage means composed of a hard disk drive, a solid-state drive, and/or other memories, for example. A part of the memory provided in the control unit 11 may be regarded as the storage unit 16. The storage unit 16 may be regarded as a part of the control unit 11.

The conveyance unit 17 is a means for conveying a medium such as a sheet along a predetermined "conveyance direction" under the control of the control unit 11, and includes a roller that conveys the medium through its rotation, a motor for driving the roller and the like, for example. The conveyance direction corresponds to "first direction". The medium is typically a sheet, but may be materials other than a sheet as long as recording can be performed on the medium through liquid ejection.

The recording head 19 includes a plurality of nozzles 21 as exemplified in FIG. 2 described later, and ejects liquid such as ink from each nozzle 21 to a medium 30 under the control of the control unit 11. The droplet ejected by the nozzle 21 is also referred to as dot. As is known, the recording apparatus 10 controls the application of a driving signal to a driving element not illustrated in the drawing provided in the nozzle 21 in accordance with the recording data representing the image so as to record the image on the medium 30 by allowing or not allowing the nozzle 21 to eject dots. The recording head 19 can eject ink of each color of cyan (C), magenta (M), yellow (Y) and black (K), inks of other colors, or liquid other than ink. The recording head 19 may be referred to as liquid ejection head, printing head, print head, ink-jet head and the like.

Figure 2:
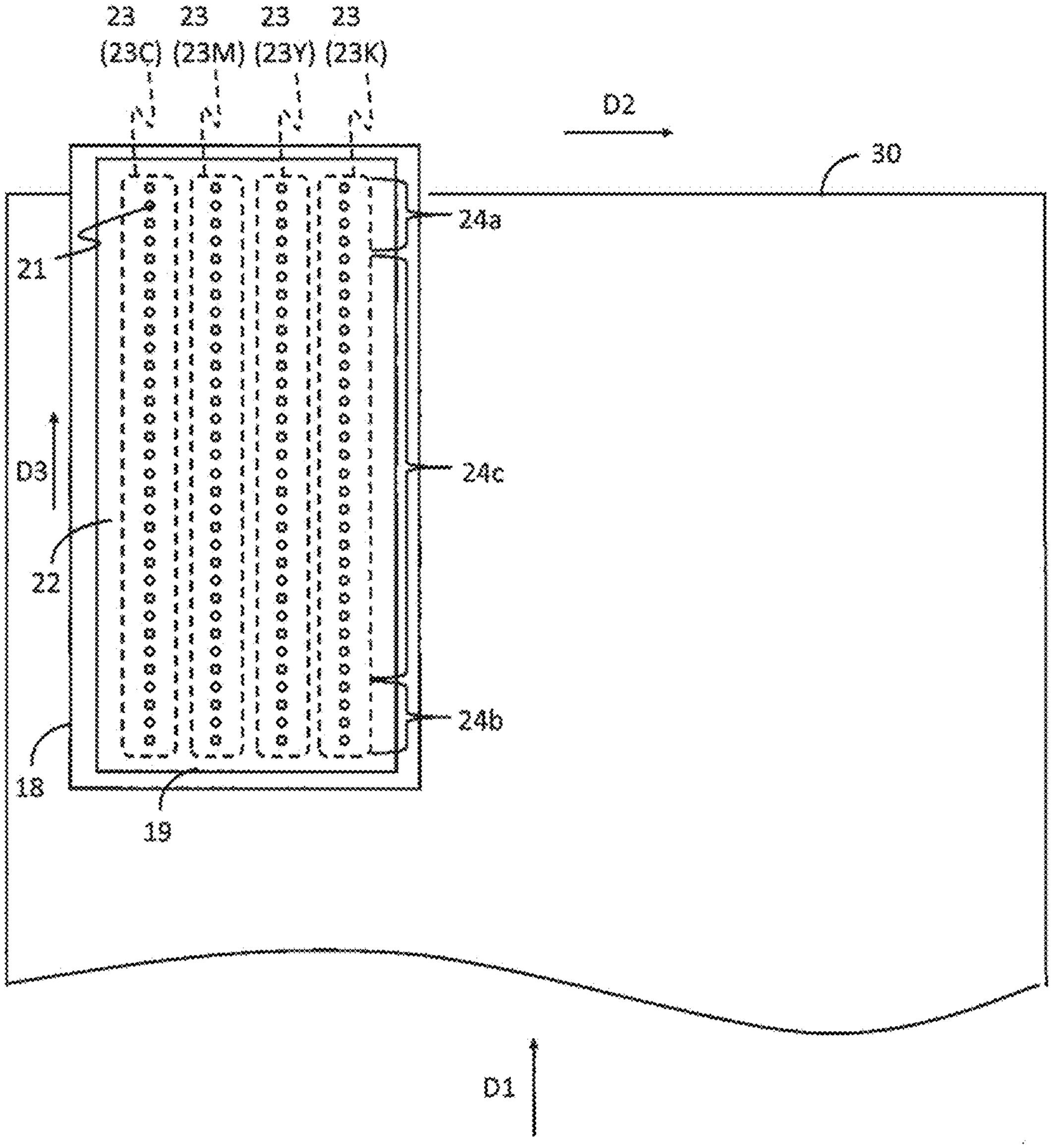
FIG. 2 is a diagram schematically illustrating a relationship between a medium and a recording head as viewed from above.

The carriage 18 is a mechanism in which the recording head 19 is mounted as illustrated in FIG. 2 that can move back and forth along a "main scanning direction" that intersects the conveyance direction by receiving the power of a motor not illustrated in the drawing. The main scanning direction corresponds to "second direction". Thus, the recording head 19 performs a forward movement and backward movement along the main scanning direction together with the carriage 18. The intersection of the conveyance direction and the main scanning direction may be interpreted as orthogonal. Note that orthogonality is not limited to strict orthogonality, but may be an intersection including errors that may occur in the product.

FIG. 2 schematically illustrates a relationship between the recording head 19 and the medium 30 as viewed from above. In each drawing, a conveyance direction D1 and a main scanning direction D2 are also illustrated as necessary. The upstream side and the downstream side in the conveyance direction D1 are simply referred to as the upstream side and the downstream side. In addition, the direction pointed by the arrow of the main scanning direction D2 is the direction of the forward movement of the carriage 18, and the direction opposite to the direction pointed by the arrow of the main scanning direction D2 is the direction of the backward movement of the carriage 18.

FIG. 2 illustrates an arrangement of the nozzle 21 in a nozzle surface 22 of the recording head 19. The nozzle surface 22 is a surface where the nozzle 21 is open, and faces the medium 30 and a platen described later. In FIG. 2, each small circle indicates each nozzle 21. In a configuration in which ink of each color is supplied from a liquid holding means called ink cartridge or ink tank not illustrated in the drawing and ejected from the nozzle 21, the recording head 19 includes a nozzle row 23 for the ink of each color, here, the inks of CMYK. Each nozzle row 23 is composed of the plurality of nozzles 21 arranged with a constant or substantially constant distance (nozzle pitch) between the nozzles in the conveyance direction D1. The direction in which the plurality of nozzles 21 making up the nozzle row 23 are arranged is referred to as "nozzle row direction D3".

Here, an ideal arrangement in which the nozzle row direction D3 and the conveyance direction D1 are parallel to each other is described for the sake of ease of description, although a configuration in which the nozzle row direction D3 obliquely intersects the conveyance direction D1 is also known as a configuration of the recording head 19. The nozzle row 23 composed of the nozzles 21 that eject C ink is also referred to as nozzle row 23C. Likewise, the nozzle row 23 composed of the nozzles 21 that eject M ink is also referred to as nozzle row 23M, the nozzle row 23 composed of the nozzles 21 that eject Y ink as the nozzle row 23Y, and the nozzle row 23 composed of the nozzles 21 that eject K ink as nozzle row 23K. The positions of the nozzle rows 23C, 23M, 23Y and 23K are the same in the nozzle row direction D3, and they are disposed side by side in the direction orthogonal to the nozzle row direction D3.

The control unit 11 performs recording on the medium 30 through a combination of conveyance of the medium 30 from the upstream side to the downstream side by the conveyance unit 17, i.e., a "conveyance operation" of relatively moving the recording head 19 and the medium 30 in the first direction, "forward scanning", which is ink ejection along with the forward movement of the recording head 19, and "backward scanning", which is ink ejection along with the backward movement of the recording head 19. When the forward scanning and/or the backward scanning is being executed, the medium 30 is stopped. The recording through the forward scanning and the backward scanning is also referred to as bidirectional recording. In addition, the forward scanning and the backward scanning are also referred to as forward path and backward path, respectively, or simply as path.

In the embodiment, the range inside the nozzle row 23 is recognized by sectioning it into a first nozzle group 24*a*, a second nozzle group 24*b* and a third nozzle group 24*c* along the nozzle row direction D3. In the example illustrated in FIG. 2, of the plurality of nozzles 21 making up the nozzle row 23, a predetermined number of the nozzles 21 on the downstream side is referred to as the first nozzle group 24*a*, a predetermined number of the nozzles 21 on the upstream side as the second nozzle group 24*b*, and the plurality of nozzles 21 located between the first nozzle group 24*a* and the second nozzle group 24*b* as the third nozzle group 24*c*. Note that the expressions as the first nozzle group, the second nozzle group and the like are merely reference names, and a predetermined number of the nozzles 21 on the downstream side and a predetermined number of the nozzles 21 on the upstream side may be referred to as the second nozzle group 24*b* and the first nozzle group 24*a*, respectively. The description is continued below with reference to the example of FIG. 2.

The sections of the first nozzle group 24*a*, the second nozzle group 24*b*, and the third nozzle group 24*c* are common in the nozzle rows 23C, 23M, 23Y and 23K. Each of the first nozzle group 24*a*, the second nozzle group 24*b*, and the third nozzle group 24*c* may be interpreted as being composed of the nozzles 21 that are successive in the nozzle row direction D3. Note that for example, one or more nozzles 21 on the downstream side including the nozzle 21 located most downstream in the nozzle row 23 may be interpreted as not belonging to the first nozzle group 24*a*, and one or more nozzles 21 on the upstream side including the nozzle 21 located most upstream in the nozzle row 23 may be interpreted as not belonging to the second nozzle group 24*b*. In addition, for example, some nozzles 21 located between the first nozzle group 24*a* and the second nozzle group 24*b* may be interpreted as not belonging to the third nozzle group 24*c*.

Figure 3A:
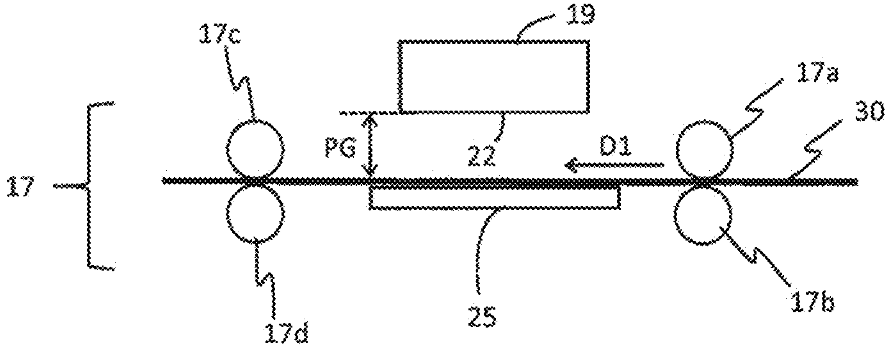
FIG. 3A is a diagram schematically illustrating a relationship between a medium and a recording head that is not bowed and the like as viewed from a lateral side.
Figure 3B:
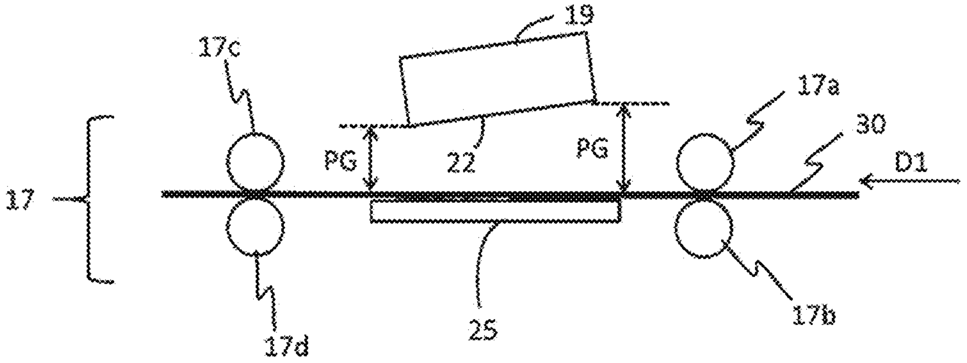
FIG. 3B is a diagram schematically illustrating a relationship between a medium and a bowed recording head and the like as viewed from a lateral side.

FIGS. 3A and 3B schematically illustrate a relationship between the recording head 19 and the medium 30 and the like as viewed in the main scanning direction D2. The reference numeral 25 represents a platen 25 as a part of the conveyance path of the medium 30. The platen 25 supports, from below, the medium 30 that is being conveyed.

A first roller pair composed of a roller 17*a* and a roller 17*b* is disposed upstream of the recording head 19*a*. In addition, a second roller pair composed of a roller 17*c* and a roller 17*d* is disposed downstream of the recording head 19. The roller pairs are a part of the conveyance unit 17. The roller pair conveys the medium 30 downstream by rotating with the medium 30 sandwiched between the rollers making up the pair. Naturally, the rollers provided in the conveyance unit 17 is not limited to the rollers illustrated in the drawing. In addition, the means for the conveyance unit 17 to convey the medium 30 may be a belt, a table or and the like that is movable with the medium 30 placed on it.

The recording head 19 is supported at an upper position facing the platen 25. In FIGS. 3A and 3B, the carriage 18 is omitted. The bottom surface of the recording head 19 that faces the platen 25 is the nozzle surface 22, and ink is ejected to the medium 30 supported by the platen 25 from each nozzle 21 that opens at the nozzle surface 22. FIG. 3A illustrates PG, which is the distance between the medium 30 and the recording head 19. PG may be referred to as head height that means the height of the recording head 19 from the medium 30.

The PG adjusting unit 20 includes a motor, a support mechanism and the like for moving up and down the recording head 19, for example. The PG adjusting unit 20 moves the carriage 18 including the recording head 19 in the direction away from the platen 25 and the direction toward the platen 25, and consequently adjusts the PG. Note that a distance measurement sensor that can measure the PG may be mounted in the recording head 19, and the control unit 11 may cause the PG adjusting unit 20 to correctly adjust the PG while monitoring the measurement result of the distance measurement sensor. In addition, the distance measurement sensor may measure the distance from a predetermined position of the recording head 19 to the platen 25, and the control unit 11 may determine the PG by subtracting the numerical value acquired as the thickness of the medium 30 from that measurement result.

The example of FIG. 3B is different from the example of FIG. 3A in that the recording head 19 is attached in a tilted manner. With reference to FIG. 3B, the recording head 19 is tilted such that the downstream end portion is lower than the upstream end portion. That is, the downstream end portion of the recording head 19 is in a "bowed" state. With such a tilt, the recording head 19 has different PGs between the downstream end portion and the upstream end portion as seen in FIG. 3B. The greater the PG, the longer the jetting time until the dots ejected from the nozzle 21 impinges on the medium 30. Therefore, when there is a tilt as illustrated in FIG. 3B, the dot ejected from the upstream nozzle 21 impinges on the front side of the dot ejected from the downstream nozzle 21 in the travelling direction of the recording head 19 even when dots are simultaneously ejected from the nozzle 21 in the vicinity of the downstream end portion and the nozzle 21 in the vicinity of the upstream end portion in the nozzle row 23 in the path. As a result, there is a displacement between the impinging positions of the two dots in the main scanning direction D2.

Although not shown in the drawing, in some cases, the nozzle row direction D3 of the recording head 19 is tilted with respect to the conveyance direction D1, that is, the recording head 19 is attached in the state where it is rotated with respect to the conveyance direction D1 in a plane parallel to the surface of the medium 30. When such a rotation is caused, the impinging positions of the two dots are also displaced along the main scanning direction D2 when dots are simultaneously ejected from the nozzle 21 in the vicinity of the downstream end portion and the nozzle 21 in the vicinity of the upstream end portion in the nozzle row 23 in the path.

In the following description, the tilt of the recording head 19 such as the above-described bow and rotation may be collectively and simply referred to as "tilt".

Further, when bidirectional recording is executed, inherent displacement of each machine body of the apparatus may be caused also between the dot ejected in the forward scanning and the dot ejected in the backward scanning.

In the embodiment, an inspection pattern suitable for the detection of the positional displacement of the recording result due to the tilt and the bidirectional recording is recorded on the medium 30.

The recording apparatus 10 may be implemented not only with one independent printer, but also with a plurality of apparatuses communicatively connected to each other. For example, the recording apparatus 10 may be implemented as a system including an information processing device including the control unit 11 and the like, and a printer including the conveyance unit 17, the carriage 18, the recording head 19 and the like.

2. Recording of Inspection Pattern

Figure 4:
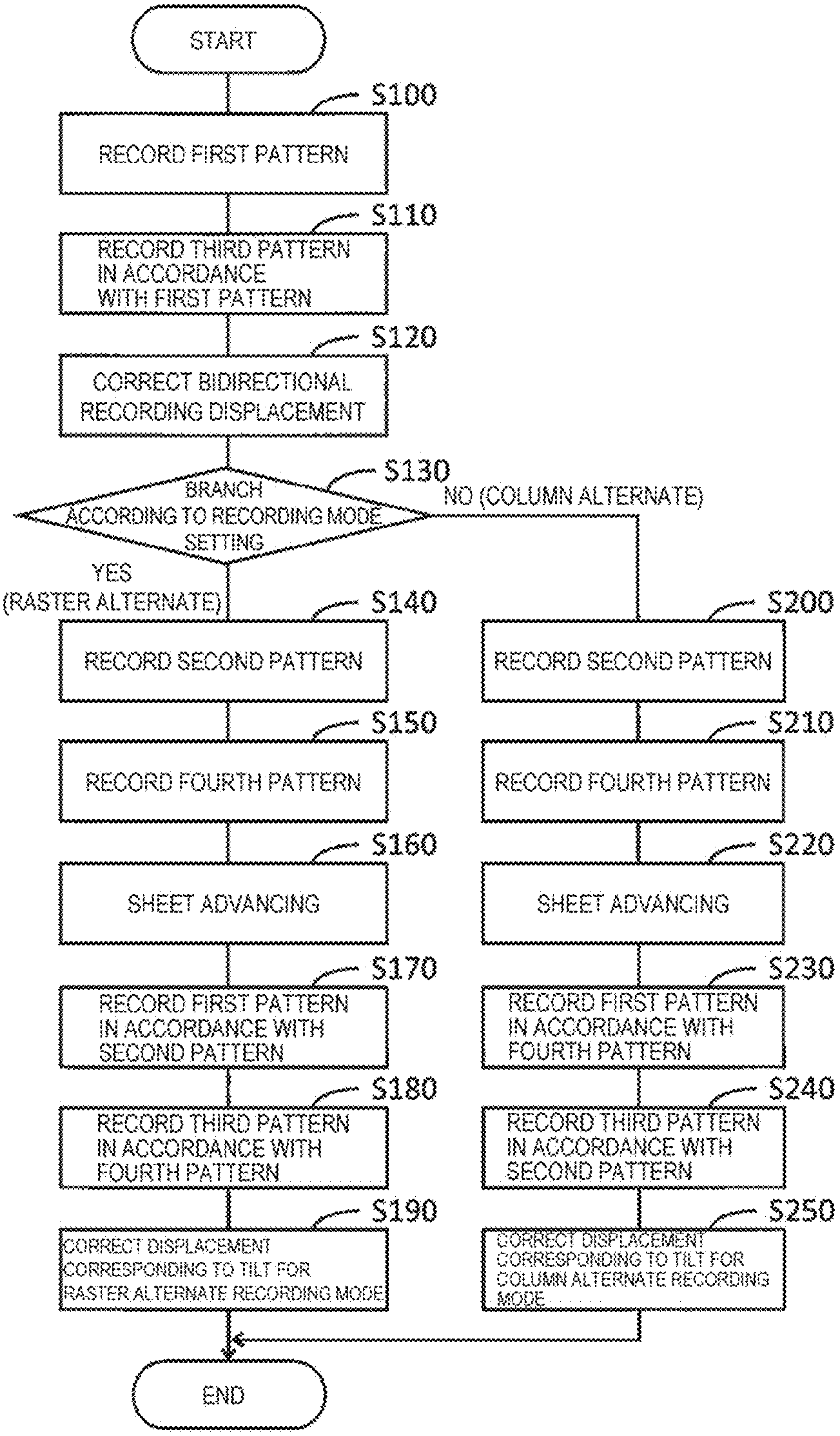
FIG. 4 is a flow flowchart illustrating recording of an inspection pattern and correction based on a recording result.

FIG. 4 is a flow flowchart illustrating recording of an inspection pattern and correction based on a recording result. The inspection pattern is a collective term of patterns and patches that are recorded in the embodiment. The flowchart of FIG. 4 illustrates "single adjusting operation" in the embodiment.

At step S100, the inspection pattern recording unit 12*a* of the control unit 11 forms a "first pattern" on the medium 30 through a control of causing the carriage 18 and the recording head 19 to execute the forward scanning, and the ink ejection from the first nozzle group 24*a*.

At step S110, the inspection pattern recording unit 12*a* forms a "third pattern" through a control of causing the carriage 18 and the recording head 19 to execute the backward scanning, and the ink ejection from the first nozzle group 24*a* in accordance with the first pattern recorded on the medium 30 at step S100.

As a result of steps S100 and S110, the recording of a "first patch" composed of the first pattern and the third pattern is completed. The conveyance unit 17 does not convey the medium 30 between step S100 and step S110. Thus, steps S100 and S110 correspond to "first control" of forming the first patch on the medium 30 with no conveyance operation.

Figure 5A:
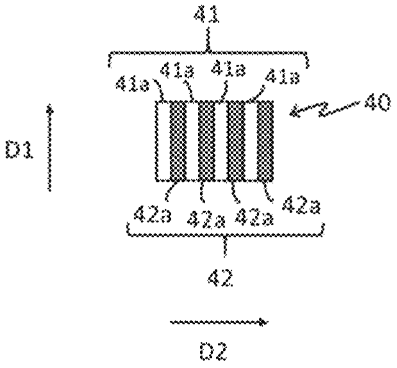
FIG. 5A is a diagram illustrating an example of a patch image data.

FIG. 5A is an example of patch image data 40. The patch image data 40 is recording data serving as a basis for recording a patch, and is stored in the storage unit 16 and the like in advance. FIG. 5A also illustrates a correspondence relationship between the patch image data 40 and the directions D1 and D2. The patch image data 40 includes first pattern data 41 representing a plurality of first rectangle images 41*a* disposed along the main scanning direction D2 at a constant interval, and second pattern data 42 representing a plurality of second rectangle images 42*a* disposed along the main scanning direction D2 at a constant interval. Each of the first rectangle image 41*a* and the second rectangle image 42*a* has a constant width in the main scanning direction D2.

In the example illustrated in FIG. 5A, in the patch image data 40, the width of the first rectangle image 41*a*, the width of the second rectangle image 42*a*, the width of the gap between the first rectangle images 41*a*, and the width of the gap between the second rectangle images 42*a* are the equal to each other. Thus, the patch image data 40 represents a patch composed of the first rectangle images 41*a* and the second rectangle images 42*a* that are alternately disposed along the main scanning direction D2. In addition, the positions of the first pattern data 41 and the second pattern data 42 in the conveyance direction D1 are the same or substantially the same. In other words, the first pattern data 41 and the second pattern data 42 are disposed at overlapping positions as viewed in the main scanning direction D2.

The patch represented by the patch image data 40 is an image for detecting the positional displacement of the first pattern data 41 and the second pattern data 42 in the recording result. Therefore, preferably, the first rectangle image 41*a* and the second rectangle image 42*a* are images with different colors for the sake of easy detection of the displacement. The color of the first rectangle image 41*a* and the color of the second rectangle image 42*a* may be referred to as first color and second color, respectively. In the embodiment, the colors of the first color and the second color are not specifically limited.

Alternatively, the first rectangle image 41*a* and the second rectangle image 42*a* may be images with the same hue and different densities such as light grey and dark grey.

Alternatively, the first rectangle image 41*a* and the second rectangle image 42*a* may be images with the same color. Even in the case where the first pattern data 41 and the second pattern data 42 are the images with the same color, a positional displacement therebetween generated in the recording result is visually recognized as the color of the medium 30 itself in the form of a gap in the patch, and thus the presence/absence and the degree of the positional displacement can be detected.

Figure 5B:
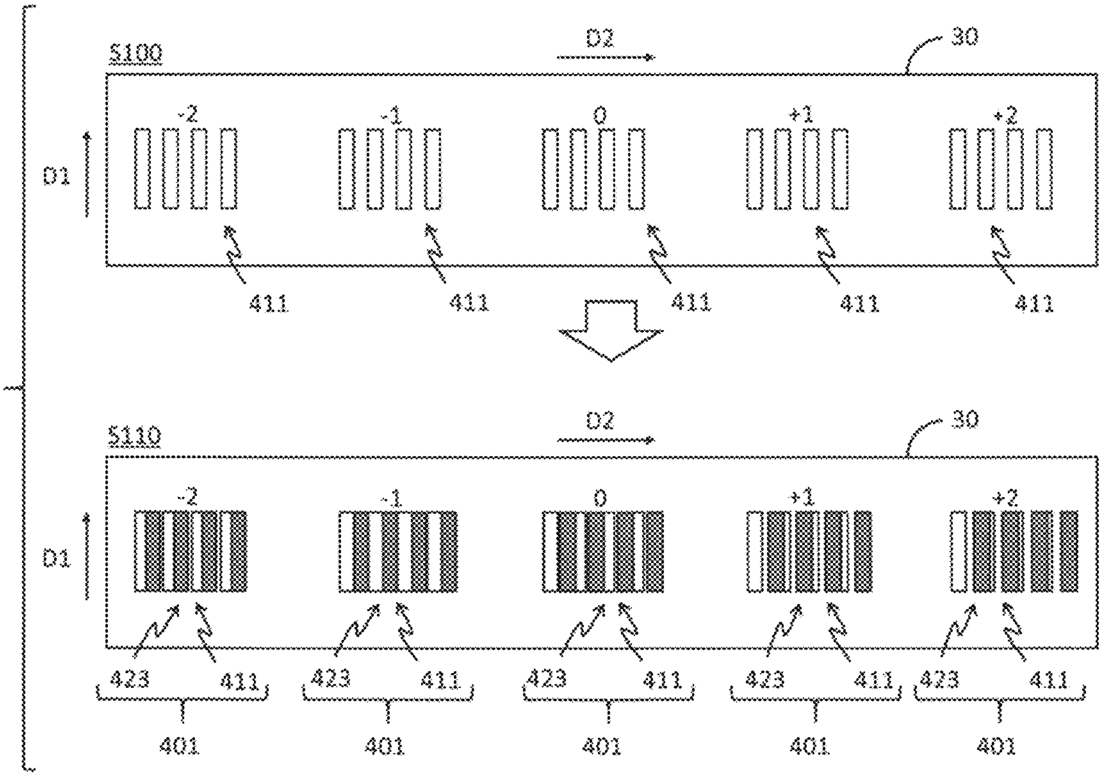
FIG. 5B is a diagram for describing a state where a first patch is recorded by a first control.

FIG. 5B is a diagram for describing a specific example of a state where a first patch 401 is recorded on the medium 30 through steps S100 and S110. FIG. 5B and FIGS. 7 to 10 described later illustrate a part of the medium 30.

At step S100, the inspection pattern recording unit 12*a* forms a first pattern 411 on the medium 30 by ejecting ink from the nozzle 21 of the first nozzle group 24*a* on the basis of the first pattern data 41 of the patch image data 40 in the forward scanning. In the example of FIG. 5B, the inspection pattern recording unit 12*a* records a plurality of the first patterns 411 at an interval in the main scanning direction D2 on the medium 30. In the example of FIG. 5B, five first patterns 411 are recorded.

Subsequently to the forward scanning at step S100, at step S110, the inspection pattern recording unit 12*a* forms a third pattern 423 on the medium 30 by ejecting ink from the nozzle 21 of the first nozzle group 24*a* on the basis of the second pattern data 42 of the patch image data 40 in the backward scanning without interposing the conveyance operation. In the example of FIG. 5B, the inspection pattern recording unit 12*a* forms five third patterns 423 in accordance with the first patterns 411 at an interval in the main scanning direction D2. As a result, as illustrated in FIG. 5B, five first patches 401 composed of the first pattern 411 and the third pattern 423 are recorded on the medium 30.

As with the relationship between the first pattern data 41 and the second pattern data 42 in the patch image data 40, the first pattern 411 and the third pattern 423 in the first patch 401 are disposed at overlapping positions as viewed in the main scanning direction D2. The configuration in which the two patterns making up the patch are disposed at overlapping positions as viewed in the main scanning direction D2 is the same for the second, third, fourth, fifth patches described later.

Here, regarding the recording of patches, "forming the other pattern in accordance with one pattern" means forming a plurality of patches such that the relative positions of a plurality of patterns making up the patches are different from each other in the main scanning direction D2. More specifically, at step S110, the inspection pattern recording unit 12*a* records a plurality of the first patches 401 such that each third pattern 423 has a different shift amount with respect to the first pattern 411 in the main scanning direction D2. The numerical values "−2", "−1", "0", "+1" and "+2" indicated for respective first patches 401 in the medium 30 of FIG. 5B exemplify such shift amounts. The indication of the shift amount may be or may not be actually recorded on the medium 30 together with patterns and patches.

The shift amount "0" means recording without performing the shifting process, i.e., recording of the first pattern data 41 and the second pattern data 42 represented by the patch image data 40 as they are. The minus shift amount means recording with a shift to the direction of the backward movement. The plus shift amount means recording with a shift to the direction of the forward movement.

Here, as an example, the unit of the shift amount is one pixel while various units such as 1 mm unit are conceivable for the unit of the shift amount. Here, the pixel is a pixel that makes up the recording data or the patch image data 40 that is two-dimensional bit map image data. For example, in the case where the shift amount is set to "−2", the inspection pattern recording unit 12*a* forms the third pattern 423 on the medium 30 by using the second pattern data 42 shifted by two pixels to the direction of the backward movement relative to the second pattern data 42 in the patch image data 40. Likewise, in the case where the shift amount is set to "+1", the inspection pattern recording unit 12*a* forms the third pattern 423 on the medium 30 by using the second pattern data 42 shifted by one pixel to the direction of the forward movement relative to the second pattern data 42 in the patch image data 40. As a result of such a process, as illustrated in FIG. 5B, the plurality of the first patches 401 separated from each other in the main scanning direction D2, in which the relative positions of the first pattern 411 and the third pattern 423 in the main scanning direction D2 are different from each other, are recorded on the medium 30.

At step S120, the positional displacement correction unit 12*b* of the control unit 11 corrects the displacement of the bidirectional recording on the basis of the recording result of the first patch. The displacement of the bidirectional recording is a positional displacement between the dot formed through the forward scanning and the dot formed through the backward scanning in the main scanning direction D2. The first patch is composed of the first pattern formed by the first nozzle group 24*a* through the forward scanning and the third pattern formed by the first nozzle group 24*a* through the backward scanning, and is therefore suitable for the detection of the displacement of the bidirectional recording.

The positional displacement correction unit 12*b* acquires the correction amount for the displacement of the bidirectional recording. For example, in the case where the plurality of the first patches 401 as illustrated in FIG. 5B have been recorded on the medium 30, the user visually identifies the first patch 401 whose positional relationship between the first pattern 411 and the third pattern 423 is most ideal. In the example illustrated in FIG. 5B, in the first patch 401 with the shift amount "0", a displacement is caused between the first pattern 411 and the third pattern 423. This means that there is a displacement of the bidirectional recording in the recording apparatus 10 under present circumstances. On the other hand, the first patch 401 with the shift amount "−1" has the most ideal positional relationship between the first pattern 411 and the third pattern 423. In view of this, the user inputs the shift amount "−1" of the first patch 401 by operating the operation reception unit 14. The positional displacement correction unit 12*b* acquires the shift amount "−1" input in this manner as the correction amount for the displacement of the bidirectional recording.

Alternatively, the medium 30 on which the plurality of the first patches 401 are recorded may be read by a scanner not illustrated in the drawing, and the read image data as the read result may be input to the recording apparatus 10. The positional displacement correction unit 12*b* receiving the input of the read image data may identify the first patch 401 with the most ideal positional relationship between the first pattern 411 and the third pattern 423 by analyzing the read image data, and may acquire the shift amount corresponding to the identified first patch 401 as the correction amount for the displacement of the bidirectional recording.

The positional displacement correction unit 12*b* corrects the displacement of the bidirectional recording in accordance with the acquired correction amount. In the case where the correction amount is "−1" as in the above-described example, the positional relationship between the recording through the forward scanning and the recording through the backward scanning in the main scanning direction D2 becomes ideal by shifting the entirety of the dot ejection timing of the backward scanning by one pixel in the movement direction, i.e., by delaying it by one pixel. In view of this, the positional displacement correction unit 12*b* sets a setting of shifting the entirety of the dot ejection timing in the backward scanning by the recording head 19 by one pixel in the movement direction relative to the timing according to the recording data, and applies this setting to the backward scanning to be subsequently executed. Alternatively, the positional displacement correction unit 12*b* may set a setting of shifting the entirety of the dot ejection timing in the forward scanning by the recording head 19 by one pixel in the movement direction relative to the timing according to the recording data, and applies this setting to the forward scanning to be subsequently executed. Alternatively, the positional displacement correction unit 12*b* may correct both the dot ejection timing in the forward scanning and the dot ejection timing in the backward scanning in accordance with the acquired correction amount such that consequently, the positional relationship between the recording through the forward scanning and the recording through the backward scanning in the main scanning direction D2 becomes ideal.

After step S120, at step S130, the inspection pattern recording unit 12*a* divides the process in accordance with the recording mode set in advance regarding the recording on the "overlapping region" that is a target of both the ink ejection from the first nozzle group 24*a* and the ink ejection from the second nozzle group 24*b*. In a recording method for performing the recording by combining the path and the conveyance of the medium 30, so-called overlapping recording of recording one raster line by multiple paths is known. The raster line is one line composed of pixels disposed side by side along the main scanning direction D2 in recording data representing a given image, which can be referred to as pixel row. Note that one line composed of pixels disposed side by side along the conveyance direction D1 is referred to as pixel column.

Various combinations of the nozzles 21 are used for the overlapping recording of each raster line making up the recording data. For example, a certain raster line is recorded by using the nozzle 21 belonging to the first nozzle group 24*a* and the nozzle 21 belonging to the third nozzle group 24*c*. In addition, for example, another raster line is recorded by using the nozzle 21 belonging to the third nozzle group 24*c* and the nozzle 21 belonging to the second nozzle group 24*b*. In addition, a certain raster line may be recorded by using the plurality of nozzles 21 belonging to the third nozzle group 24*c*. In addition, a certain raster line may be recorded by one nozzle 21 without being subjected to the overlapping recording.

In any case, in the embodiment, it is assumed that when performing the recording based on recording data, the recording apparatus 10 performs the recording on at least a part of the raster line by using the plurality of nozzles 21 including the nozzle 21 belonging to the first nozzle group 24*a* and the nozzle 21 belonging to the second nozzle group 24*b*. The raster line recorded by the plurality of nozzles 21 including the nozzle 21 belonging to the first nozzle group 24*a* and the nozzle 21 belonging to the second nozzle group 24*b* is collectively referred to as overlapping region.

In the embodiment, "raster alternate recording mode" and "column alternate recording mode" are assumed as the above-described recording mode. The inspection pattern recording unit 12*a* proceeds from "Yes" of step S130 to step S140 when the set recording mode is a raster alternate recording mode, whereas the inspection pattern recording unit 12*a* proceeds from "No" of step S130 to step S200 when the set recording mode is a column alternate recording mode. The raster alternate recording mode and the column alternate recording mode may be simply referred to as first recording mode and second recording mode.

Naturally, the recording after step S120 is recording to which the correction of step S120 is applied. In addition, in the recording at steps S140 to S180 and the recording at steps S200 to S240, the medium 30 on which the first patch is recorded may be used as it is, or the medium 30 other than the medium 30 on which the first patch is recorded may be used.

Figure 6A:
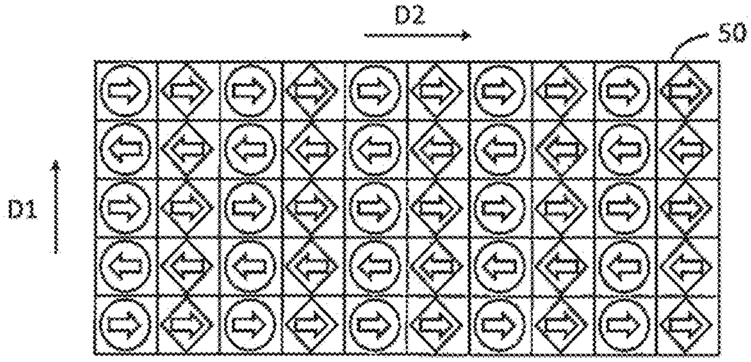
FIG. 6A is a diagram for describing an example of a raster alternate recording mode.

FIG. 6A is a diagram for describing an example of a raster alternate recording mode, and illustrates a part of recording data 50 representing some image. Each rectangle in the recording data 50 represents each pixel making up the recording data 50. In the recording data 50, one line of pixels along the main scanning direction D2 is one raster line.

Each pixel of the recording data 50 is illustrated with a circle, a rhombus, or a white arrow for convenience of description. The circle means that the corresponding pixel is recorded by the nozzle 21 belonging to the first nozzle group 24*a*, and the rhombus means that the corresponding pixel is recorded by the nozzle 21 belonging to the second nozzle group 24*b*. In addition, the white arrow in the pixel represents the direction of the path for the recording of the corresponding pixel, i.e., either the forward scanning or the backward scanning for the recording. Naturally, recording of a pixel means ejection of a dot from the nozzle 21 when a dot is set to the pixel in the recording data.

In FIG. 6A, in the raster alternate recording mode, all pixels in one raster line are recorded by the path of the same direction, and in the plurality of raster lines disposed side by side in the conveyance direction D1, the direction of the path is alternately changed for each one of the raster lines. In addition, in FIG. 6A, the pixels in one raster line alternate between the pixel to be recorded by the nozzle 21 of the first nozzle group 24*a* and the pixel to be recorded by the nozzle 21 of the second nozzle group 24*b* along the main scanning direction D2. In this manner, as illustrated in FIG. 6A, each raster line recorded by the raster alternate recording mode corresponds to the overlapping region.

Figure 6B:
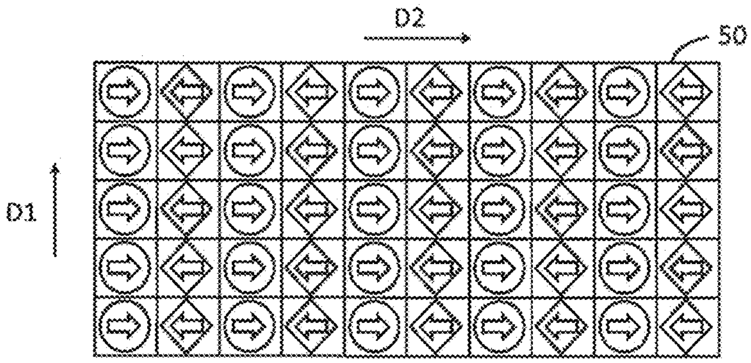
FIG. 6B is a diagram for describing an example of a column alternate recording mode.
Figure 6C:
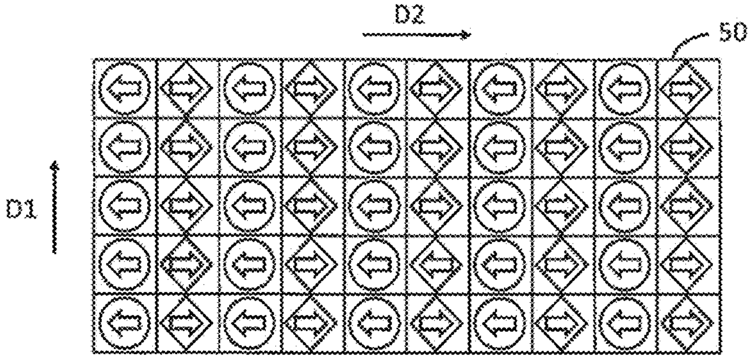
FIG. 6C is a diagram for describing another example of a column alternate recording mode.

FIGS. 6B and 6C are diagrams for describing an example of a column alternate recording mode, and illustrate a part of the recording data 50. The views of FIGS. 6B and 6C are the same as the view of FIG. 6A. In the column alternate recording mode, all pixels in one column, i.e., in the pixel column are recorded by the path of the same direction, and, in a plurality of pixel columns arranged in the main scanning direction D2, the direction of the path is alternately changed for each one of the pixel columns. In addition, in FIGS. 6B and 6C, the pixels in one raster line alternate between the pixel to be recorded by the nozzle 21 of the first nozzle group 24*a* and the pixel to be recorded by the nozzle 21 of the second nozzle group 24*b* along the main scanning direction D2. In this manner, each raster line recorded by the column alternate recording mode as illustrated in FIG. 6B or 6C corresponds to the overlapping region.

FIGS. 6B and 6C differ in the direction of the path, and the combination of the first nozzle group 24*a* and the second nozzle group 24*b*. In the example of the column alternate recording mode of FIG. 6B, the raster line is recorded by the nozzle 21 of the first nozzle group 24*a* in the forward scanning and the nozzle 21 of the second nozzle group 24*b* in the backward scanning. On the other hand, in the example of the column alternate recording mode of FIG. 6C, the raster line is recorded by the nozzle 21 of the first nozzle group 24*a* in the backward scanning and the nozzle 21 of the second nozzle group 24*b* in the forward scanning. The configuration of FIG. 6B may be referred to as first column alternate recording mode, and the configuration of FIG. 6C may be referred to as second column alternate recording mode. As the column alternate recording mode, either the first column alternate recording mode or the second column alternate recording mode may be employed, and, in the recording based on one recording data 50, a certain raster line may be recorded by the first column alternate recording mode while recording another raster line by the second column alternate recording mode.

In the examples of FIGS. 6A, 6B and 6C, each raster line as the overlapping region is recorded only by the nozzle 21 of the first nozzle group 24*a* and the nozzle 21 of the second nozzle group 24*b*. Note that the raster line as the overlapping region may be recorded by the nozzle 21 of the first nozzle group 24*a*, the nozzle 21 of the second nozzle group 24*b* and the nozzle 21 of the third nozzle group 24*c*.

At step S140, the inspection pattern recording unit 12*a* forms a "second pattern" on the medium 30 through a control of causing the carriage 18 and the recording head 19 to execute the forward scanning, and the ink ejection from the second nozzle group 24*b*.

Subsequently to the forward scanning at step S140, at step S150, the inspection pattern recording unit 12*a* forms a "fourth pattern" on the medium 30 through a control of causing the carriage 18 and the recording head 19 to execute the backward scanning, and the ink ejection from the second nozzle group 24*b*.

At step S160, the inspection pattern recording unit 12*a* controls the conveyance unit 17 and executes sheet advancing. Here, the sheet advancing is a process of conveying the position of the medium 30 on which the second pattern and the fourth pattern are formed by the second nozzle group 24*b* at steps S140 and S150 to a position where recording can be performed by the first nozzle group 24*a*. The conveyance distance required for the sheet advancing is determined in advance based on the distance between the second nozzle group 24*b* and the first nozzle group 24*a* in the conveyance direction D1.

At step S170, the inspection pattern recording unit 12*a* forms a "first pattern" through a control of causing the carriage 18 and the recording head 19 to execute the forward scanning, and the ink ejection from the first nozzle group 24*a* in accordance with the second pattern recorded on the medium 30 at step S140.

Subsequently to the forward scanning at step S170, at step S180, the inspection pattern recording unit 12*a* forms a "third pattern" through a control of causing the carriage 18 and the recording head 19 to execute the backward scanning, and the ink ejection from the first nozzle group 24*a* in accordance with the fourth pattern recorded on the medium 30 at step S150.

As a result of steps S140, S160 and S170, the recording of the "second patch" composed of the first pattern and the second pattern is completed. In addition, as a result of steps S150, S160 and S180, the recording of the "third patch" composed of the third pattern and the fourth pattern is completed. The above-described steps S140 to S180 correspond to the "second control" of forming the second patch and the third patch on the medium 30.

In this manner, in the flowchart of FIG. 4, the second control is executed in addition to the first control when it is determined to be "Yes" at step S130.

Figure 7:
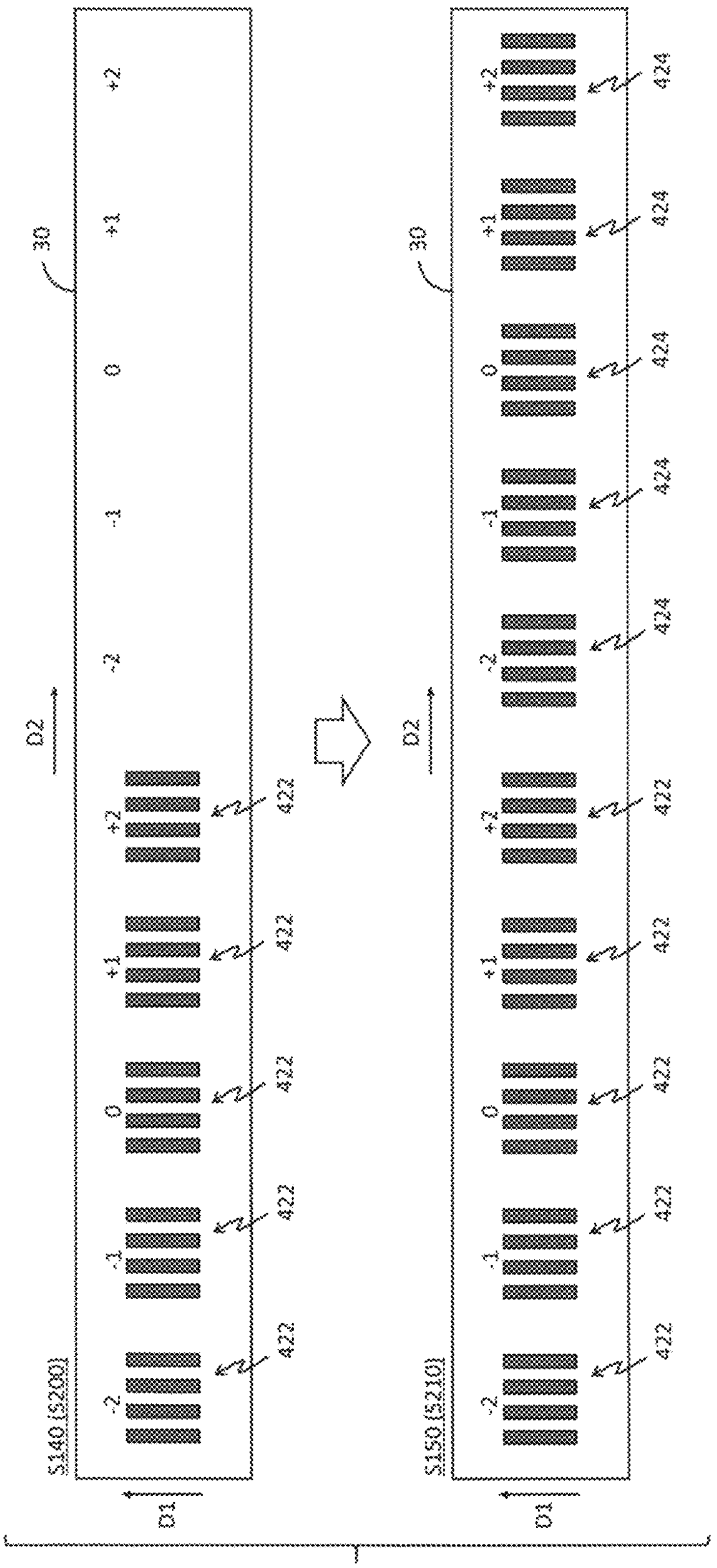
FIG. 7 is a diagram for describing a specific example of steps S140, S150, S200 and S210.
Figure 8:
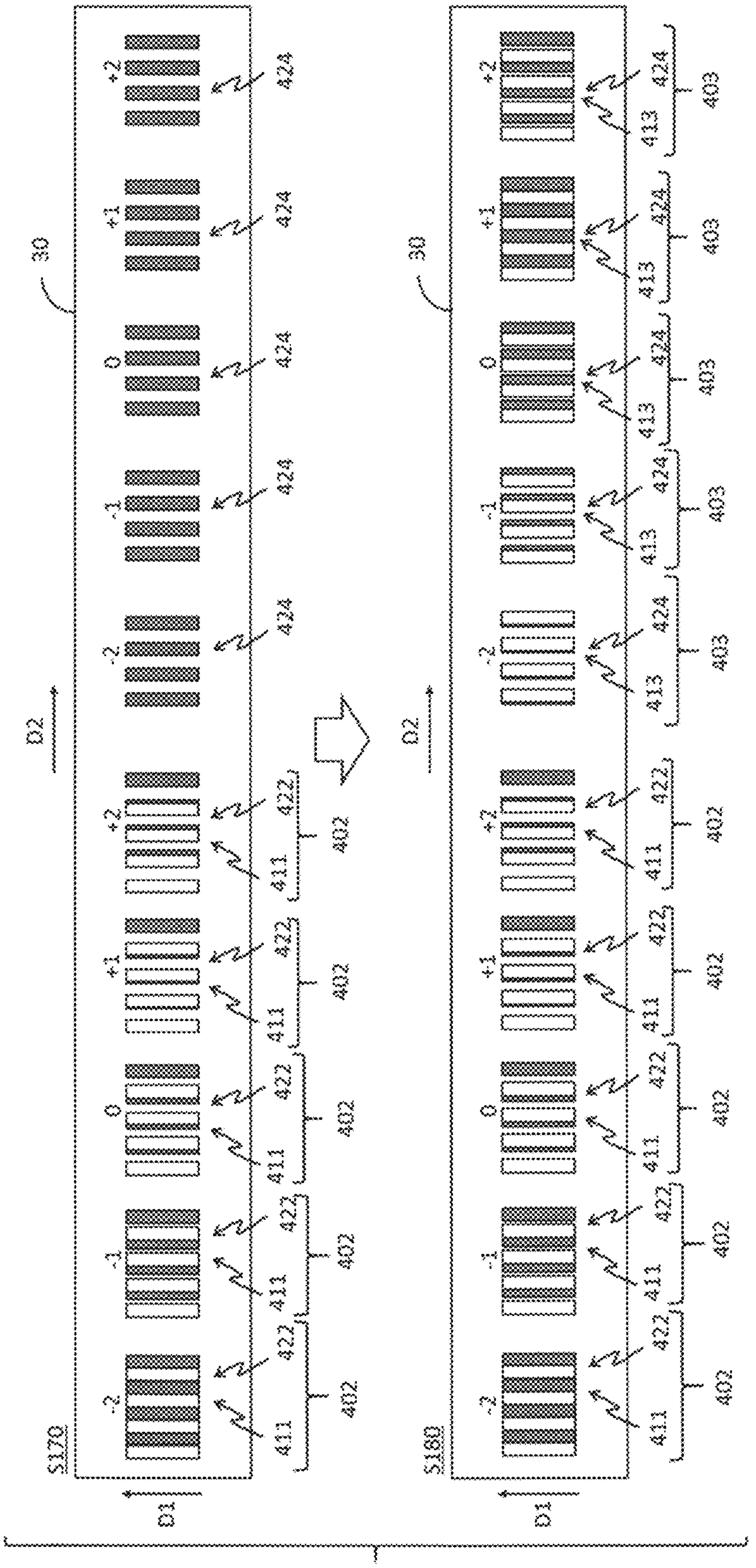
FIG. 8 is a diagram for describing a specific example of steps S170 and S180.

FIGS. 7 and 8 are diagrams for describing a specific example of a state where a second patch 402 and a third patch 403 are recorded on the medium 30 at steps S140 to S180. In particular, FIG. 7 corresponds to the description of steps S140 and S150, and FIG. 8 corresponds to the description of step S170 and S180. Note that regarding FIGS. 7 to 9, the description related to FIG. 5B is appropriately applied and the description is partially omitted.

At step S140, the inspection pattern recording unit 12*a* records a plurality of the second patterns 422 on the medium 30 at an interval in the main scanning direction D2 by causing the nozzle 21 of the second nozzle group 24*b* to eject ink on the basis of the second pattern data 42 of the patch image data 40 in the forward scanning.

Subsequently to the forward scanning at step S140, at step S150, the inspection pattern recording unit 12*a* records a plurality of fourth patterns 424 on the medium 30 at an interval in the main scanning direction D2 by causing the nozzle 21 of the second nozzle group 24*b* to eject ink on the basis of the second pattern data 42 of the patch image data 40 in the backward scanning without interposing the conveyance operation. As a result, as illustrated in FIG. 7, a plurality of the second patterns 422 and a plurality of the fourth patterns 424 are disposed side by side at an interval in the main scanning direction D2.

Next, after the sheet advancing at step S160, at step S170, the inspection pattern recording unit 12*a* records a plurality of the first patterns 411 in accordance with each of the plurality of the second patterns 422 by ejecting ink from the nozzle 21 of the first nozzle group 24*a* on the basis of the first pattern data 41 of the patch image data 40 in the forward scanning.

Subsequently to the forward scanning at step S170, at step S180, the inspection pattern recording unit 12*a* records a plurality of the third patterns 413 in accordance with each of the plurality of the fourth patterns 424 by ejecting ink from the nozzle 21 of the first nozzle group 24*a* on the basis of the first pattern data 41 of the patch image data 40 in the backward scanning without interposing the conveyance operation. As a result, as illustrated in FIG. 8, a plurality of the second patches 402 composed of the first pattern 411 and the second pattern 422 and a plurality of the third patches 403 composed of the third pattern 413 and the fourth pattern 424 are disposed side by side at an interval in the main scanning direction D2.

As seen in FIG. 8, also in the plurality of the second patches 402 and the plurality of the third patches 403, the relative position of the patterns is different in accordance with each shift amount as in the plurality of the first patches 401 illustrated in FIG. 5B. In the process of recording a plurality of patches, the position of either one pattern or the other pattern making up the patch may be shifted in accordance with the shift amounts "−2", "−1", "0", "+1", "+2" and the like. For example, at steps S140 to S180 and steps S200 to S250 described later, of one pattern and the other pattern making up the patch, the position of the pattern to be recorded first is set such that it differs from a predetermined position of the pattern to be recorded later for each patch in accordance with the shift amount.

More specifically, at step S140, the inspection pattern recording unit 12*a* forms a plurality of the second pattern 422 such that the shift amount with respect to the first pattern 411 in the main scanning direction D2 differs for each second pattern 422, and that consequently, the plurality of the second patches 402 has been recorded at the time of completion of step S170. Likewise, at step S150, the inspection pattern recording unit 12*a* forms the plurality of the fourth patterns 424 such that the shift amount with respect to the third pattern 413 in the main scanning direction D2 differs for each fourth pattern 424, and that consequently, the plurality of the third patches 403 have been recorded at the time of completion of step S180.

At step S190, the positional displacement correction unit 12*b* corrects the displacement corresponding to the tilt for the overlapping region recorded by the raster alternate recording mode on the basis of the recording result of the second patch and the third patch. The displacement corresponding to the tilt is the positional displacement of the dot corresponding to the tilt such as bow and rotation of the recording head 19 as described above. Such a positional displacement tends to be significant between dots ejected from the nozzle 21 of the first nozzle group 24*a* and the nozzle 21 of the second nozzle group 24*b* with a large distance therebetween in the conveyance direction D1. The second patch is composed of the first pattern formed by the first nozzle group 24*a* through the forward scanning and the second pattern formed by the second nozzle group 24*b* through the forward scanning. In addition, the third patch is composed of the third pattern formed by the first nozzle group 24*a* through the backward scanning and the fourth pattern formed by the second nozzle group 24*b* through the backward scanning. Therefore, the second patch and the third patch are suitable for the detection of the displacement corresponding to the tilt that is caused in the overlapping region under the raster alternate recording mode.

The positional displacement correction unit 12*b* acquires the correction amount for the displacement corresponding to the tilt. For example, when the plurality of the second patches 402 as illustrated in FIG. 8 are recorded on the medium 30, the user visually identifies the second patch 402 with the most ideal positional relationship between the first pattern 411 and the second pattern 422. In the example illustrated in FIG. 8, in the second patch 402 with the shift amount "0", a displacement is caused between the first pattern 411 and the second pattern 422. This means that there is a displacement corresponding to the tilt in the recording apparatus 10 under present circumstances. On the other hand, the second patch 402 with the shift amount "−2" has the most ideal positional relationship between the first pattern 411 and the second pattern 422. In view of this, the user inputs the shift amount "−2" of the second patch 402 by operating the operation reception unit 14. The positional displacement correction unit 12*b* acquires the shift amount "−2" input in this manner as the correction amount for the displacement corresponding to the tilt for the overlapping region that is recorded by the raster alternate recording mode through the forward scanning. The overlapping region recorded by the raster alternate recording mode through the forward scanning may be referred to also as raster line recorded by the raster alternate recording mode through the forward scanning.

Likewise, when the plurality of the third patches 403 as illustrated in FIG. 8 are recorded on the medium 30, the user inputs the shift amount, e.g., "+1", of the third patch 403 with the most ideal positional relationship between the third pattern 413 and the fourth pattern 424. The positional displacement correction unit 12*b* acquires the shift amount "+1" input in this manner as the correction amount for the displacement corresponding to the tilt for the overlapping region that is recorded by the raster alternate recording mode through the backward scanning. The overlapping region recorded by the raster alternate recording mode through the backward scanning may be referred to also as raster line recorded by the raster alternate recording mode through the backward scanning.

Naturally, as with the acquisition of the correction amount for the displacement of the bidirectional recording, the positional displacement correction unit 12*b* may acquire the correction amount for the displacement corresponding to the tilt on the basis of a scanning result of the medium 30 after the patch recording using a scanner instead of the input from the user.

The positional displacement correction unit 12*b* corrects the displacement corresponding to the tilt in accordance with the acquired correction amount. As in the above-described example, when the correction amount for the overlapping region that is recorded by the raster alternate recording mode through the forward scanning is "−2", the positional relationship between the recording by the first nozzle group 24*a* and the recording by the second nozzle group 24*b* in the overlapping region becomes ideal by shifting the entirety of the dot ejection timing of the second nozzle group 24*b* through the forward scanning in the direction opposite to the movement by two pixels, i.e., by advancing it by two pixels. In view of this, regarding each raster line that is recorded by the raster alternate recording mode through the forward scanning, the positional displacement correction unit 12*b* sets a setting of shifting by two pixels in the direction of the backward movement for the pixel that should be recorded by the nozzle 21 of the second nozzle group 24*b*, and applies this setting to the raster alternate recording mode to be subsequently executed. In addition, as in the above-described example, when the correction amount for the overlapping region that is recorded by the raster alternate recording mode through the backward scanning is "+1", the positional displacement correction unit 12*b* sets a setting of shifting by one pixel in the direction of the forward movement for the pixel that should be recorded by the nozzle 21 of the second nozzle group 24*b* regarding each raster line that is recorded by the raster alternate recording mode through the backward scanning, and applies this setting to the raster alternate recording mode to be subsequently executed.

Naturally, as long as similar correction effects are obtained, the positional displacement correction unit 12*b* may correct one or both of the recording timing of the nozzle 21 of the first nozzle group 24*a* for recording the overlapping region and the recording timing of the nozzle 21 of the second nozzle group 24*b* for recording the overlapping region in accordance with the acquired correction amount. The same applies to step S250 described later. After step S190, the flowchart of FIG. 4 is terminated. The correction at step S190 and step S250 can be said to be a preliminary setting process for the correction to be subsequently performed on the recording data when executing recording based on the recording data arbitrarily selected by the user, rather than a process of actually performing correction on given recording data at the timings.

At step S200, the inspection pattern recording unit 12*a* forms a "second pattern" on the medium 30 through a control of causing the carriage 18 and the recording head 19 to execute the forward scanning, and the ink ejection from the second nozzle group 24*b*. Subsequently to the forward scanning at step S200, at step S210, the inspection pattern recording unit 12*a* forms a "fourth pattern" on the medium 30 through a control of causing the carriage 18 and the recording head 19 to execute the backward scanning, and the ink ejection from the second nozzle group 24*b*. That is, steps S200 and S210 are the same processes as steps S140 and S150. The sheet advancing at step S220 is also the same process as step S160.

At step S230, the inspection pattern recording unit 12*a* forms a “first pattern” through a control of causing the carriage 18 and the recording head 19 to execute the forward scanning, and the ink ejection from the first nozzle group 24*a* in accordance with the fourth pattern recorded on the medium 30 at step S210. Subsequently to the forward scanning at step S230, at step S240, the inspection pattern recording unit 12*a* forms a “third pattern” through a control of causing the carriage 18 and the recording head 19 to execute the backward scanning, and the ink ejection from the first nozzle group 24*a* in accordance with the second pattern recorded on the medium 30 at step S200.

As a result of steps S210, S220 and S230, the recording of the “fourth patch” composed of the first pattern and the fourth pattern is completed. In addition, as a result of steps S200, S220 and S240, the recording of the “fifth patch” composed of the second pattern and the third pattern is completed. The above-described steps S200 to S240 correspond to the “third control” of forming the fourth patch and the fifth patch on the medium 30.

In this manner, in the flowchart of FIG. 4, the third control is executed in addition to the first control when it is determined to be “No” at step S130.

Figure 9:
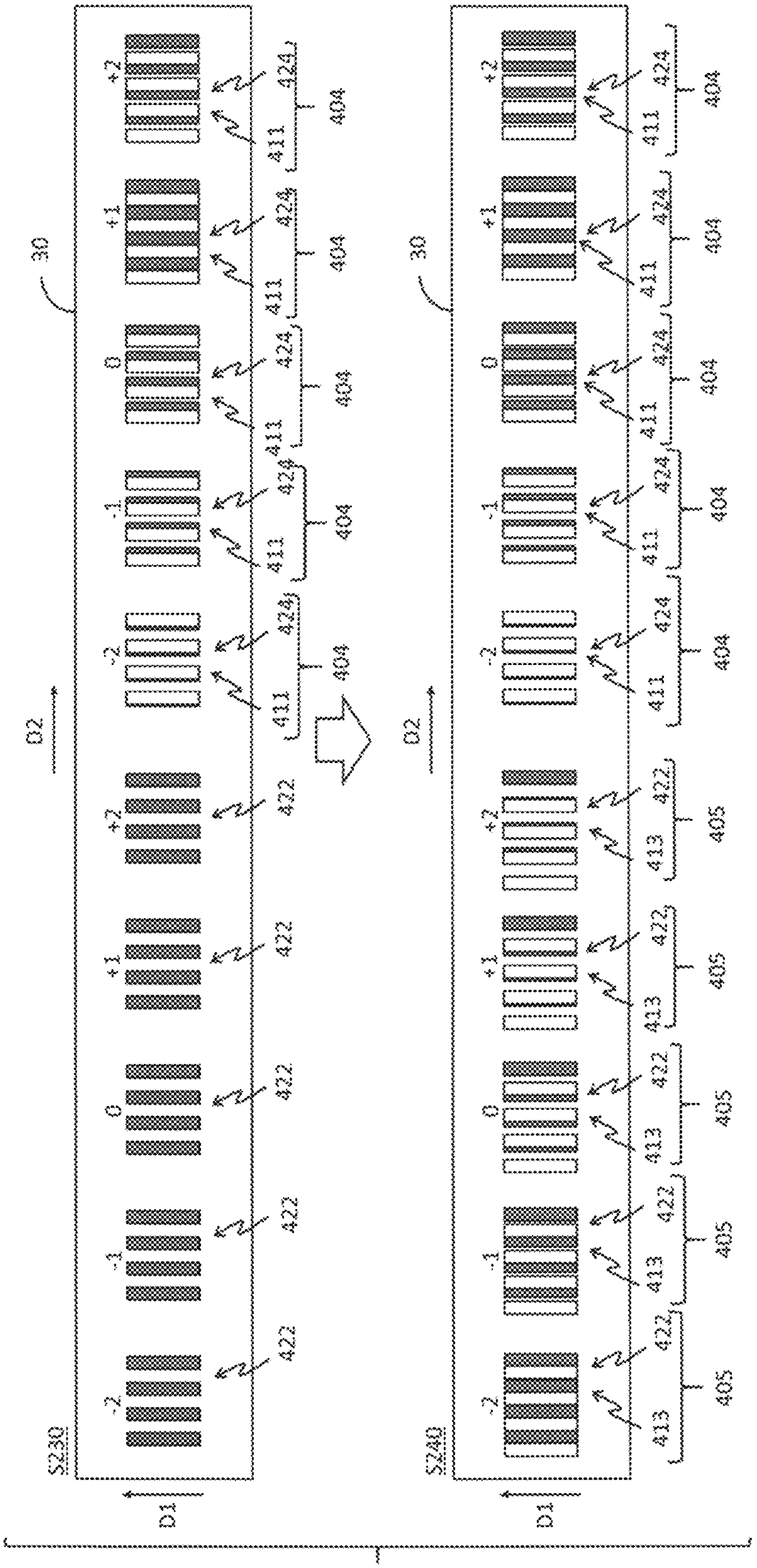
FIG. 9 is a diagram for describing a specific example of steps S230 and S240.

FIGS. 7 and 9 are diagrams for describing a specific example of a state where a fourth patch 404 and a fifth patch 405 are recorded on the medium 30 at steps S200 to S240. That is, the description of steps S140 and S150 with reference to FIG. 7 may be applied to the specific example of steps S200 and S210. FIG. 9 corresponds to the description of steps S230 and S240.

After the sheet advancing at step S220, at step S230, the inspection pattern recording unit 12*a* records the plurality of the first patterns 411 in accordance with each of the plurality of the fourth patterns 424 by ejecting ink from the nozzle 21 of the first nozzle group 24*a* on the basis of the first pattern data 41 of the patch image data 40 in the forward scanning.

Subsequently to the forward scanning at step S230, at step S240, the inspection pattern recording unit 12*a* records the plurality of the third patterns 413 in accordance with each of the plurality of the second patterns 422 by ejecting ink from the nozzle 21 of the first nozzle group 24*a* on the basis of the first pattern data 41 of the patch image data 40 in the backward scanning without interposing the conveyance operation. As a result, as illustrated in FIG. 9, a plurality of the fourth patches 404 composed of the first pattern 411 and the fourth pattern 424 and a plurality of the fifth patches 405 composed of the second pattern 422 and the third pattern 413 are disposed side by side at an interval in the main scanning direction D2.

As seen in FIG. 9, also in the plurality of fourth patches 404 and the plurality of fifth patches 405, the relative position of the patterns is different in accordance with each shift amount. More specifically, at step S200, the inspection pattern recording unit 12*a* forms the plurality of the second pattern 422 such that the shift amount with respect to the third pattern 413 in the main scanning direction D2 differs for each second pattern 422, and that consequently, the plurality of fifth patches 405 have been recorded at the time of completion of step S240. Likewise, at step S210, the inspection pattern recording unit 12*a* forms the plurality of the fourth patterns 424 such that the shift amount with respect to the first pattern 411 in the main scanning direction D2 differs for each fourth pattern 424, and that consequently, the plurality of fourth patches 404 have been recorded at the time of completion of step S230.

At step S250, the positional displacement correction unit 12*b* corrects the displacement corresponding to the tilt for the overlapping region recorded by the column alternate recording mode on the basis of the recording result of the fourth patch and the fifth patch. The fourth patch is composed of the first pattern formed by the first nozzle group 24*a* through the forward scanning and the fourth pattern formed by the second nozzle group 24*b* through the backward scanning. In addition, the fifth patch is composed of the second pattern formed by the second nozzle group 24*b* through the forward scanning and the third pattern formed by the first nozzle group 24*a* through the backward scanning. Therefore, the fourth patch and the fifth patch are suitable for the detection of the displacement corresponding to the tilt that is caused in the overlapping region under the column alternate recording mode.

The positional displacement correction unit 12*b* acquires the correction amount for the displacement corresponding to the tilt. For example, when the plurality of fourth patches 404 as illustrated in FIG. 9 are recorded on the medium 30, the user visually identifies the fourth patch 404 with the most ideal positional relationship between the first pattern 411 and the fourth pattern 424. In the example illustrated in FIG. 9, the fourth patch 404 with the shift amount “+1” has the most ideal positional relationship between the first pattern 411 and the fourth pattern 424. In view of this, the user inputs the shift amount “+1” of the fourth patch 404 by operating the operation reception unit 14. The positional displacement correction unit 12*b* acquires the shift amount “+1” input in this manner as the correction amount for the displacement corresponding to the tilt for the overlapping region that is recorded by the first column alternate recording mode (see FIG. 6B). The overlapping region recorded by the first column alternate recording mode may be referred to also as raster line recorded by the first column alternate recording mode.

Likewise, when the plurality of fifth patches 405 as illustrated in FIG. 9 are recorded on the medium 30, the user inputs the shift amount, e.g., “−2”, of the fifth patch 405 with the most ideal positional relationship between the second pattern 422 and the third pattern 413. The positional displacement correction unit 12*b* acquires the shift amount “−2” input in this manner as the correction amount for the displacement corresponding to the tilt for the overlapping region that is recorded by the second column alternate recording mode (see FIG. 6C). The overlapping region recorded by the second column alternate recording mode may be referred to also as raster line recorded by the second column alternate recording mode.

The positional displacement correction unit 12*b* corrects the displacement corresponding to the tilt in accordance with the acquired correction amount. As in the above-described example, when the correction amount for the overlapping region that is recorded by the first column alternate recording mode is “+1”, the positional relationship between the recording by the first nozzle group 24*a* and the recording by the second nozzle group 24*b* in the overlapping region becomes ideal by shifting the entirety of the dot ejection timing of the second nozzle group 24*b* of the backward scanning in the direction opposite to the movement by one pixel, i.e., by advancing it by one pixel. In view of this, regarding each raster line recorded by the first column alternate recording mode, the positional displacement correction unit 12*b* sets a setting of shifting by one pixel in the direction of the forward movement for the pixel that should be recorded by the nozzle 21 of the second nozzle group 24*b* of the backward scanning, and applies this setting to the first column alternate recording mode to be subsequently executed. In addition, as in the above-described example, when the correction amount for the overlapping region that is recorded by the second column alternate recording mode is "−2", the positional displacement correction unit 12*b* sets a setting of shifting by two pixels in the direction of the backward movement for the pixel that should be recorded by the nozzle 21 of the second nozzle group 24*b* of the forward scanning regarding each raster line that is recorded by the second column alternate recording mode, and applies this setting to the second column alternate recording mode to be subsequently executed. After such a step 250, the flowchart of FIG. 4 is terminated.

In this manner, "single adjusting operation" in the embodiment includes the recording process of a series of patterns and patches starting from step S100 and ending at step S180 or at step S240. Further, the single adjusting operation may include the correction of step S120, step S190 or step S250.

3. Effects of Correction

Figure 10:
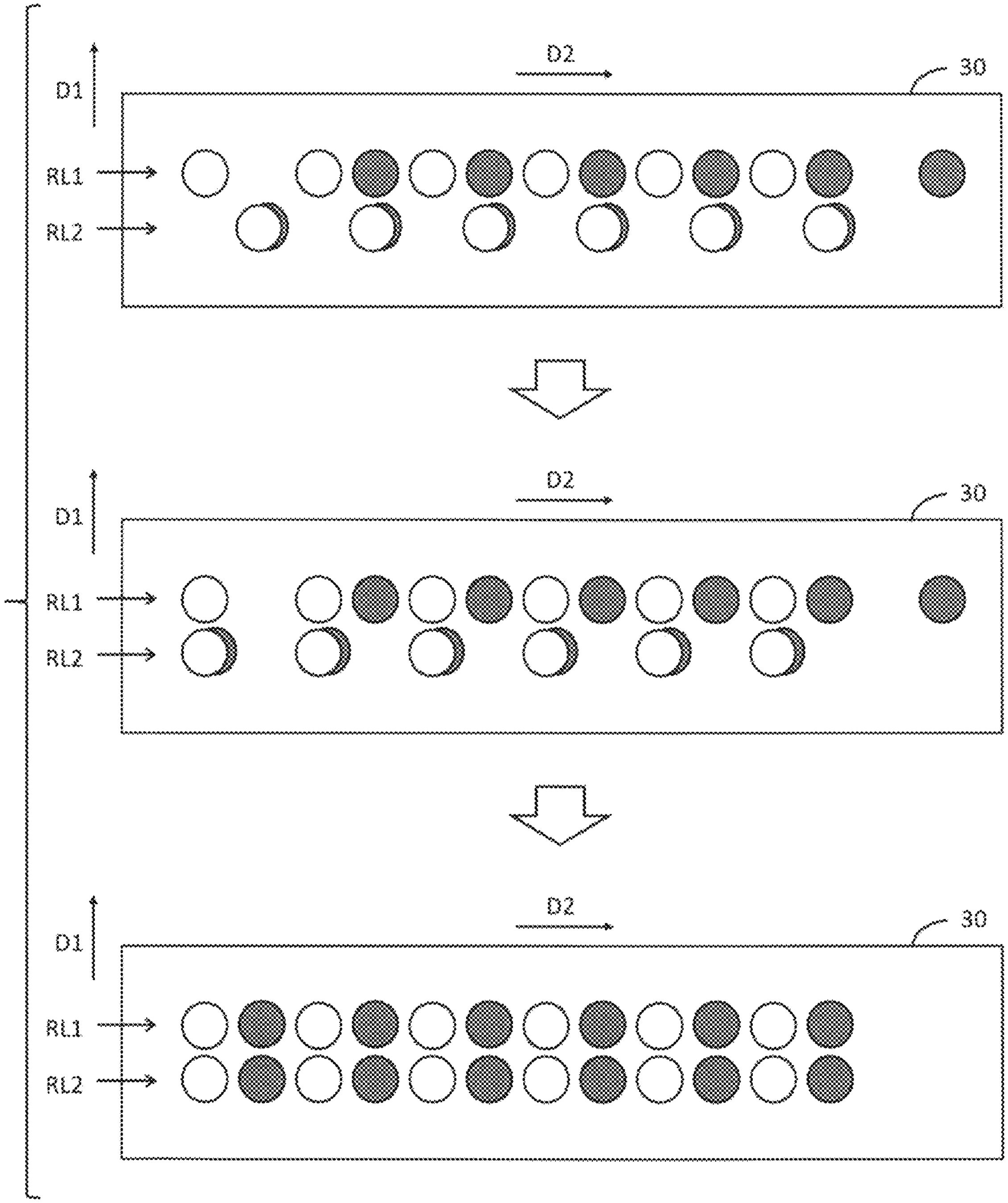
FIG. 10 is a diagram for describing an example of an effect of correction.

FIG. 10 is a diagram for describing an example of an effect of correction of the embodiment. In FIG. 10, the upper part illustrates a part of a recording result in the medium 30 of a case where the correction of the embodiment is not applied, the middle part illustrates a part of a recording result in the medium 30 of a case where only the correction of step S120 is applied, and the lower part illustrates a part of a recording result in the medium 30 of a case where the correction of step S120 and step S190 is applied. While the result that is output as a recording result based on given recording data after the flowchart of FIG. 4 is naturally the result illustrated in the lower part of FIG. 10, effects of the correction are described stepwise here for the sake of ease of understanding.

FIG. 10 illustrates recording results of two raster lines RL1 and RL2 adjacent to each other in the conveyance direction D1. The recording results of the raster lines RL1 and RL2 are also referred to simply as the raster lines RL1 and RL2. Each circle in the medium 30 is an ejected dot. The raster line RL1 is a raster line recorded by the raster alternate recording mode through the forward scanning, and the raster line RL2 is a raster line recorded by the raster alternate recording mode through the backward scanning. In addition, in FIG. 10, the white circle is a dot recorded by the nozzle 21 of the first nozzle group 24*a*, and the grey circle is a dot recorded the nozzle 21 of the second nozzle group 24*b*. The colors of the dots such as white and grey are merely expressions for identifying the nozzle 21 used for the recording, and are not the colors of the dot itself. Each of the raster lines RL1 and RL2 corresponds to the overlapping region.

The positions of the raster lines RL1 and RL2 in the main scanning direction D2 coincide with each other in the phase of the recording data. As illustrated in the upper part in FIG. 10, when the recording is performed without applying the correction of the embodiment, a displacement of the bidirectional recording, i.e., a displacement along the main scanning direction D2 is caused between the raster line RL1 recorded through the forward scanning and the raster line RL2 recorded through the backward scanning. In addition, as illustrated in the upper part in FIG. 10, in both of the raster lines RL1 and RL2, a displacement along the main scanning direction D2 corresponding to the tilt is caused between the dot (white circle) recorded by the nozzle 21 of the first nozzle group 24*a* and the dot (grey circle) recorded by the nozzle 21 of the second nozzle group 24*b*. In the raster line RL1, normally, the white circle and the grey circle should be alternately located, but the grey circle is displaced with respect to the white circle by two pixels in the direction of the forward movement. In addition, in the raster line RL2, normally, the white circle and the grey circle should be alternately located, but the grey circle is displaced by one pixel in the direction of the backward movement with respect to the white circle in an overlapping manner.

Comparing the middle part with the upper part in FIG. 10, it is seen that the displacement of the bidirectional recording between the raster lines RL1 and RL2 is corrected as a result of the correction at step S120. Further, with reference to the lower part in FIG. 10, the displacement of the white circle and the grey circle corresponding to the tilt is corrected in each of the raster lines RL1 and RL2 as a result of the correction of step S190 in addition to correction of the displacement of the bidirectional recording.

Note that while the illustration of the effects of the correction for the overlapping region of the case of the recording employing the column alternate recording mode is omitted, recording results in which the displacement of the bidirectional recording and the displacement corresponding to the tilt are corrected are naturally obtained with the effects of the corrections of step S120 and step S250.

4. Conclusion

According to the embodiment, the recording apparatus 10 includes the recording head 19 including the nozzle row 23 in which a plurality of nozzles 21 for ejecting ink to the medium 30 are disposed side by side in the nozzle row direction D3, and the control unit 11 configured to control ink ejection of the recording head 19, and recording on the medium 30 is performed by a conveyance operation of relatively moving the recording head 19 and the medium 30 in a first direction, forward scanning that is ink ejection along with a forward movement of the recording head 19 along a second direction intersecting the first direction, and backward scanning that is ink ejection along with a backward movement of the recording head 19 along the second direction. The nozzle row 23 includes, along the nozzle row direction D3, the first nozzle group 24*a*, the second nozzle group 24*b*, and the third nozzle group 24*c* between the first nozzle group 24*a* and the second nozzle group 24*b*. The control unit 11 is configured to control, in the forward scanning, formation of a first pattern on the medium 30 through ink ejection from the first nozzle group 24*a*, and formation of a second pattern on the medium 30 through ink ejection from the second nozzle group 24*b*. The control unit 11 is configured to control, in the backward scanning, formation of a third pattern on the medium 30 through ink ejection from the first nozzle group 24*a*, and formation of a fourth pattern on the medium 30 through ink ejection from the second nozzle group 24*b*. The control unit 11 is configured to execute the first control of forming the first patch 401 on the medium 30 without performing a conveyance operation, the first patch 401 being a patch in which the first pattern and the third pattern are disposed at overlapping positions as viewed in the second direction, the second control of forming the second patch 402 and the third patch 403 on the medium 30, the second patch 402 being a patch in which the first pattern and the second pattern are disposed at overlapping positions as viewed in the second direction, the third patch 403 being a patch in which the third pattern and the fourth pattern are disposed at overlapping positions as viewed in the second direction, and the third control of forming the fourth patch 404 and the fifth patch 405 on the medium 30, the fourth patch 404 being a patch in which the first pattern and the fourth pattern are disposed at overlapping positions as viewed in the second direction, the fifth patch 405 being a patch in which the second pattern and the third pattern are disposed at overlapping positions as viewed in the second direction, and the first control and the second control, or the first control and the third control are executed by a single adjusting operation.

With this configuration, the first patch 401, the second patch 402 and the third patch 403 are recorded on the medium 30 by the first control and the second control, and the first patch 401, the fourth patch 404 and the fifth patch 405 are recorded on the medium 30 by the first control and the third control. That is, a patch suitable for correction of the positional displacement of the dot due to the bidirectional recording, and a patch suitable for correction of the positional displacement of the dot due to the tilt such as bow of the recording head 19 are recorded. Thus, the recording quality can be improved by correcting the various displacements.

In addition, the positional displacement of the dot due to the tilt such as bow tends to be significant in the case of recording using the nozzle 21 of the first nozzle group 24*a* and the nozzle 21 of the second nozzle group 24*b* with a large distance therebetween in the nozzle row 23. In consideration of such a situation, in the embodiment, the second patch 402 and the third patch 403 are recorded and the fourth patch 404 and the fifth patch 405 are recorded by using the first nozzle group 24*a* and the second nozzle group 24*b*, while the third nozzle group 24*c* is not used for recording the patterns and patches. Thus, the second to fifth patches that can easily acquire the appropriate correction amount for correcting the displacement corresponding to the tilt can be recorded while generally suppressing the ink consumption required for the pattern recording.

In addition, the first patch 401 is recorded by using the first nozzle group 24*a* without performing the conveyance operation. In this manner, the first patch 401 in which the influence of errors due to the conveyance operation and the like is eliminated can be obtained while suppressing the ink consumption, and the displacement of the bidirectional recording can be corrected with high accuracy on the basis of the recording result of the first patch 401.

Note that the conveyance operation of relatively moving the recording head 19 and the medium 30 in the first direction may include not only the operation of conveying the medium 30 downstream by the conveyance unit 17 as described above, but also an operation of moving the recording head 19 upstream at a timing other than the path execution.

In addition, according to the embodiment, in each of the first control and the second control, or in each of the first control and the third control, the control unit 11 forms a plurality of the patches in which relative positions of a plurality of the patterns making up the patch in the second direction are different from each other.

With this configuration, the plurality of the first to fifth patches are formed such that the relative positions of the plurality of patterns making up the patch in the main scanning direction D2 are different from each other. In this manner, the optimum correction amount for correcting the displacement can be acquired in accordance with the patch with the most ideal positional relationship between the patterns among the plurality of patches.

Note that in the embodiment, the recording of the plurality of patches for each of the first to fifth patches is not an essential condition. The control unit 11 may record only one patch for each of the first to fifth patches, e.g., only a patch with the shift amount "0" instead of recording a plurality patches for each of first to fifth patches as illustrated in FIGS. 5B, 8 and 9. For example, even in the case where only the first patch 401 with the shift amount "0" is recorded as the first patch 401, the correction amount suitable for the correction of the displacement can be calculated by detecting the presence/absence and degree of the displacement from the positional relationship between the first pattern 411 and the third pattern 423 making up the first patch 401 in the main scanning direction D2. The same applies to the second to fifth patches.

In addition, according to the embodiment, when performing recording in an overlapping region that is a target of the ink ejection from the first nozzle group 24*a* and the ink ejection from the second nozzle group 24*b*, the control unit 11 corrects timing of at least one of the ink ejection from the first nozzle group 24*a* and ink ejection from the second nozzle group 24*b* in accordance with relative positions of the patterns making up the patch in the second direction.

That is, as can be understood from the description for step S190 and step S250, the control unit 11 corrects the timing of at least one of the ink ejection from the first nozzle group 24*a* and the ink ejection from the second nozzle group 24*b* by correcting the data for recording the overlapping region and the like on the basis of the correction amount for displacement correction acquired in accordance with the relative position between the patterns in the second and third patches and the fourth and fifth patches. In this manner, the recording quality can be improved for the overlapping region where the positional displacement of the dot due to the tilt such as bow tends to be significant.

The embodiment is not limited to apparatuses and systems, and encompasses disclosures of various categories such as a method executed by apparatuses and systems and the program 12 for causing a processor to execute the method.

That is, it is possible to understand a recording method of performing recording on the medium 30 by a conveyance operation of relatively moving the recording head 19 and the medium 30 in a first direction, forward scanning that is ink ejection along with a forward movement of the recording head 19 along a second direction intersecting the first direction, and backward scanning that is ink ejection along with a backward movement of the recording head 19 along the second direction, the recording head 19 including the nozzle row 23 in which a plurality of nozzles 21 for ejecting ink to the medium 30 are disposed side by side in the nozzle row direction D3. In this method, the nozzle row 23 includes, along the nozzle row direction D3, the first nozzle group 24*a*, the second nozzle group 24*b*, and the third nozzle group 24*c* between the first nozzle group 24*a* and the second nozzle group 24*b*. In this method, the first control and the second control, or the first control and the third control are executed by a single adjusting operation, provided that a pattern that is formed on the medium 30 through ink ejection from the first nozzle group 24*a* in the forward scanning is a first pattern, a pattern that is formed on the medium 30 through ink ejection from the second nozzle group 24*b* in the forward scanning is a second pattern, a pattern that is formed on the medium 30 through the ink ejection from the first nozzle group 24*a* in the backward scanning is a third pattern, and a pattern that is formed on the medium 30 through the ink ejection from the second nozzle group 24*b* in the backward scanning is a fourth pattern, and a control of forming the first patch 401 on the medium 30 without performing the conveyance operation is the first control, the first patch 401 being a patch in which the first pattern and the third pattern are disposed at overlapping positions as viewed in the second direction, a control of forming the second patch 402 and the third patch 403 on the medium 30 is the second control, the second patch 402 being a patch in which the first pattern and the second pattern are disposed at overlapping positions as viewed in the second direction, the third patch 403 being a patch in which the third pattern and the fourth pattern are disposed at overlapping positions as viewed in the second direction, and a control of forming the fourth patch 404 and the fifth patch 405 on the medium 30 is the third control, the fourth patch 404 being a patch in which the first pattern and the fourth pattern are disposed at overlapping positions as viewed in the second direction, the fifth patch 405 being a patch in which the second pattern and the third pattern are disposed at overlapping positions as viewed in the second direction.

5. Modification

Some modifications encompassed in the embodiment are described below.

First Modification

In addition to the above-described raster alternate recording mode and column alternate recording mode, a "cross recording mode" can be assumed as a recording mode.

Figure 11A:
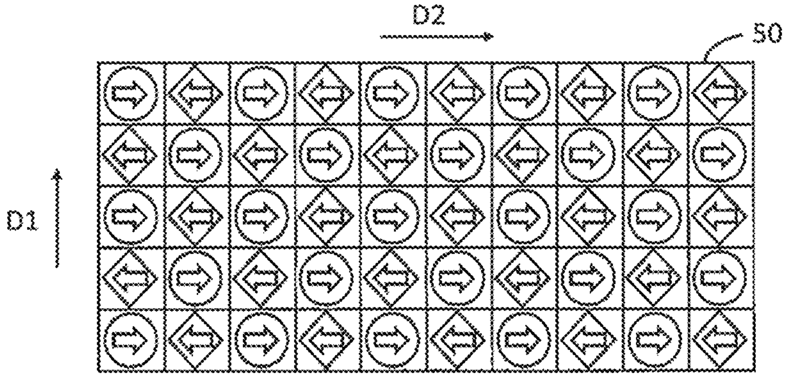
FIG. 11A is a diagram for describing an example of a cross recording mode.
Figure 11B:
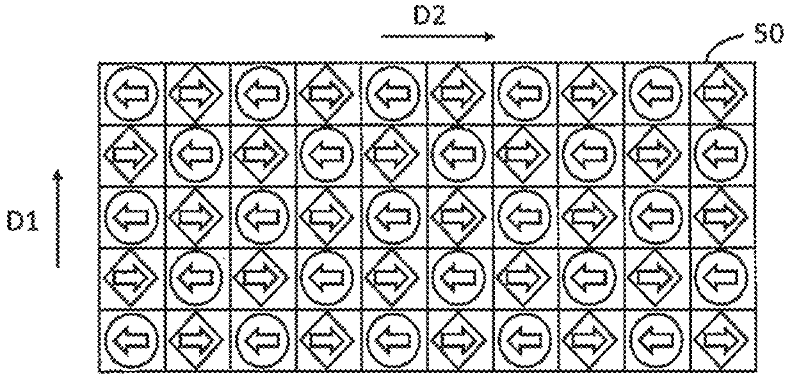
FIG. 11B is a diagram for describing another example of the cross recording mode.

FIGS. 11A and 11B are diagrams for describing an example of a cross recording mode, and illustrate a part of the recording data 50. The view of FIGS. 11A and 11B is the same as the view of FIGS. 6A, 6B and 6C. In the cross recording mode, the pixels alternate between the pixel recorded through the forward scanning and the pixel recorded through the backward scanning along the conveyance direction D1 and the main scanning direction D2. Further, the pixels in one raster line alternate between the pixel to be recorded by the nozzle 21 of the first nozzle group 24*a* and the pixel to be recorded by the nozzle 21 of the second nozzle group 24*b* along the main scanning direction D2. Therefore, each raster line recorded by the cross recording mode as illustrated in FIG. 11A or 11B corresponds to the overlapping region.

The difference between FIGS. 11A and 11B is the same as the difference between FIGS. 6B and 6C. That is, in the example of the cross recording mode of FIG. 11A, the raster line is recorded by the nozzle 21 of the first nozzle group 24*a* through the forward scanning and the nozzle 21 of the second nozzle group 24*b* through the backward scanning. On the other hand, in the example of the cross recording mode of FIG. 11B, the raster line is recorded by the nozzle 21 of the first nozzle group 24*a* through the backward scanning and the nozzle 21 of the second nozzle group 24*b* through the forward scanning. The configuration of FIG. 11A and the configuration of FIG. 11B may be referred to as first cross recording mode and second cross recording mode, respectively. As the cross recording mode, either the first cross recording mode or the second cross recording mode may be employed, and in the recording based on one recording data 50, a certain raster line may be recorded by the first cross recording mode while recording another raster line by the second cross recording mode.

Comparing FIG. 11A with FIG. 6B, they are different from each other in that the pixels with the same combination of the direction of the path and the nozzle group used for the recording are shifted from each other such that they do not adjacent to each other in the conveyance direction D1 between the raster lines adjacent to each other in the conveyance direction D1. Likewise, comparing FIG. 11B with FIG. 6C, they are different from each other in that the pixels with the same combination of the direction of the path and the nozzle group used for the recording are shifted from each other such that they do not adjacent to each other in the conveyance direction D1 between the raster lines adjacent to each other in the conveyance direction D1.

In this manner, in the cross recording mode, one raster line includes the pixel recorded through the forward scanning and the pixel recorded through the backward scanning, and the pixel to be recorded by the nozzle 21 of the first nozzle group 24*a* and the pixel to be recorded by the nozzle 21 of the second nozzle group 24*b*, which is the same characteristic as that of the column alternate recording mode. Therefore, in the flowchart of FIG. 4, the cross recording mode may be handled in the same manner as the column alternate recording mode. That is, when the recording mode set for the recording on the overlapping region is the cross recording mode, the inspection pattern recording unit 12*a* need only execute steps S200 to S250 from the branch of step S130 in the same manner as the column alternate recording mode. The description made above may be interpreted by regarding the column alternate recording mode as the cross recording mode, the first column alternate recording mode as the first cross recording mode, and the second column alternate recording mode as the second cross recording mode. The term "cross recording mode" is merely a name, and it may be referred to as zigzag recording mode or the like, or third recording mode, for example.

Second Modification

When executing the first control and the second control, the control unit 11 may form the first pattern 411 for making up the first patch 401 and the second pattern 422 for making up the second patch 402, on the medium 30 by the same forward scanning.

Figure 12:
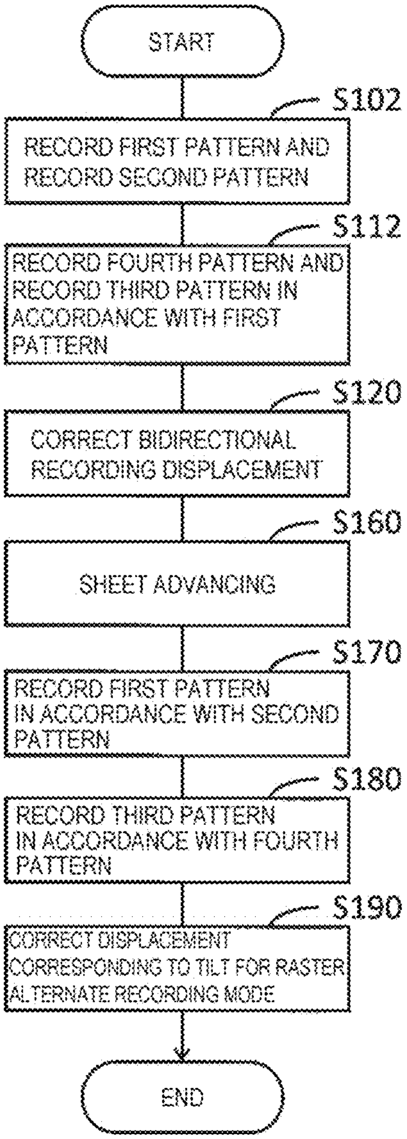
FIG. 12 is a flowchart illustrating a second modification of a case where a raster alternate recording mode is set.

FIG. 12 is a flow flowchart illustrating recording of an inspection pattern and correction according to a second modification. The control unit 11 can execute the flowchart of FIG. 12 when the recording mode set in advance for the recording of the overlapping region is the raster alternate recording mode.

At step S102, the inspection pattern recording unit 12*a* forms a "first pattern" on the medium 30 through a control of causing the carriage 18 and the recording head 19 to execute the forward scanning and the ink ejection from the first nozzle group 24*a*, and the inspection pattern recording unit 12*a* forms a "second pattern" on the medium 30 through the ink ejection from the second nozzle group 24*b*. That is, step S102 is a process serving as both step S100 and step S140 of FIG. 4. As can be seen from the description made above, as a result of step S102, the first pattern 411 illustrated in FIG. 5B and the second pattern 422 illustrated in FIG. 7 are recorded on the medium 30 through a single forward scanning.

Subsequently to the forward scanning at step S102, at step S112, the inspection pattern recording unit 12*a* performs a control of causing the carriage 18 and the recording head 19 to execute the backward scanning without interposing the conveyance operation. Then, a "fourth pattern" is formed on the medium 30 through the ink ejection from the second nozzle group 24*b*, and a "third pattern" is formed through the ink ejection from the first nozzle group 24*a* in accordance with the first pattern recorded at step S102. That is, step S112 is a process serving as both step S110 and step S150 of FIG. 4. As a result of step S112, the fourth pattern 424 illustrated in FIG. 7 and the third pattern 423 illustrated in FIG. 5B are recorded on the medium 30 through a single backward scanning. Thus, at the time of completion of step S112, the first patch 401 illustrated in FIG. 5B and the second pattern 422 and the fourth pattern 424 illustrated in FIG. 7 have been recorded on the medium 30. Naturally, the first patch 401 is recoded downstream of the second pattern 422 and the fourth pattern 424 in the medium 30.

Steps S120, S160, S170, S180 and S190 subsequent to step S112 are as described above with FIG. 4. In such a flowchart of FIG. 12, steps S102 and S112 correspond to the first control. In addition, steps S102 and S112 serve also as a part of the second control. In this manner, by forming the first pattern 411 for making up the first patch 401 and the second pattern 422 for making up the second patch 402 through the same forward scanning, the first control and the second control unit can proceed in part in parallel, and thus the time required for the first control and the second control can be shortened. In addition, according to FIG. 12, by forming the third pattern 423 for making up the first patch 401 and the fourth pattern 424 for making up the third patch 403 through the same backward scanning, the first control and the second control unit can proceed in part in parallel, and thus the control time required for the first control and the second can be shortened.

Each raster line making up the overlapping region recorded by the raster alternate recording mode is recorded through only the forward scanning or only the backward scanning, and is not affected by the displacement of the bidirectional recording. The second patch 402 and the third patch 403 in accordance with the raster alternate recording mode are recorded through only the forward scanning or only the backward scanning, and are naturally not affected by the displacement of the bidirectional recording. Therefore, as illustrated in FIG. 12, even when the second control is started before the correction of step S120, the second patch 402 and the third patch 403 completed at steps S170 and S180 are patches accurately reflecting the displacement corresponding to the tilt such as bow.

Note that in the flowchart of FIG. 12, the positional displacement correction unit 12*b* may execute step S120 not at a timing earlier than step S160, but at a timing when all recording of the first patch 401, the second patch 402 and the third patch 403 is completed, i.e., a timing after step S180.

As described above, steps S140 and S150 are the same processes as steps S200 and S210 in FIG. 4. Therefore, it can be said that step S102 is a process serving as both step S100 and step S200 of FIG. 4, and step S112 is a process serving as both step S110 and step S210 of FIG. 4. Thus, although not illustrated in the drawings, the flowchart according to the second modification that is executable in the case where the column alternate recording mode is set for the recording of the overlapping region can be understood by replacing steps S160 to S190 in FIG. 12 with steps S220 to S250 of FIG. 4. With such a flowchart of the second modification performed in accordance with the column alternate recording mode, the effect of shortening the time required for the first control and the third control can also be obtained.

Third Modification

The control unit 11 can change the movement speed of the recording head 19 along the second direction, i.e., the main scanning direction D2. The movement speed of the recording head 19, i.e., the speed of the forward movement and the backward movement is the movement speed of the carriage 18 in practice. In the following description, the movement speed of the recording head 19 is simply referred to as movement speed. On this premise, the control unit 11 may execute, in the first control, a first speed control of forming the first patch 401 by setting the movement speed to the first speed, and the control unit 11 may further execute, in the first control, a second speed control of forming the first patch 401 by setting the movement speed to a second speed different from the first speed.

The first speed and the second speed are speeds that are set in advance. For example, the first speed<the second speed holds. In the first patch 401 recorded on the medium 30 through the first speed control, there is a displacement of the bidirectional recording that is caused when the forward scanning and the backward scanning are executed at the first speed. As such, the control unit 11 can obtain the correction amount (first correction amount) for correcting the displacement of the bidirectional recording of the case where the bidirectional recording is executed at the first speed on the basis of the first patch 401 that is recorded on the medium 30 through the first speed control. Likewise, in the first patch 401 recorded on the medium 30 through the second speed control, there is a displacement of the bidirectional recording that is caused when the forward scanning and the backward scanning are executed at the second speed. As such, the control unit 11 can obtain the correction amount (second correction amount) for correcting the displacement of the bidirectional recording of the case where the bidirectional recording is executed at the second speed on the basis of the first patch 401 that is recorded on the medium 30 through the second speed control.

Further, when performing the recording based on the recording data arbitrarily selected by the user by setting the movement speed to a third speed different from the first speed and the second speed, the control unit 11 controls the recording based on the first patch 401 formed by the first speed control and the first patch 401 formed by the second speed control. The control of the recording based on the first patch 401 formed through the first speed control and the first patch 401 formed through the second speed control means that the recording is controlled based on the first correction amount and the second correction amount. More specifically, the control unit 11 calculates the correction amount (third correction amount) for correcting the displacement of the bidirectional recording of the case where the bidirectional recording is executed at the third speed through a predetermined interpolation computation from the first correction amount and the second correction amount on the basis of the relationship of the size, ratio and the like between the first speed, the second speed and the third speed. Then, when performing the recording based on the recording data with the movement speed set at the third speed, the control unit 11 need only correct the timing of at least one of the ink ejection through the forward scanning and the ink ejection through the backward scanning in accordance with the third correction amount as described for step S120. With such a configuration, the control unit 11 can obtain high-quality recording results in which the displacement due to the bidirectional recording that is caused at the set movement speed is corrected, regardless of the set movement speed for executing the recording.

Fourth Modification

The control unit 11 can cause the PG adjusting unit 20 to adjust the PG. On this premise, the control unit 11 may execute, in the first control, the first distance control of forming the first patch 401 by setting the PG to the first distance, and the control unit 11 may further execute, in the first control, the second distance control of forming the first patch 401 by setting the PG to the second distance different from the first distance.

The first distance and the second distance are PGs set in advance. For example, the first distance<the second distance holds. In the first patch 401 recorded on the medium 30 by the first distance control, there is a displacement of the bidirectional recording that is caused when the forward scanning and the backward scanning are executed with the PG=the first distance. As such, on the basis of the first patch 401 recorded on the medium 30 by the first distance control, the control unit 11 can obtain the correction amount (fourth correction amount) for correcting the displacement of the bidirectional recording of the case where the bidirectional recording is executed with the PG=the first distance. Likewise, in the first patch 401 recorded on the medium 30 by the second distance control, there is a displacement of the bidirectional recording that is caused when the forward scanning and the backward scanning are executed with the PG=the second distance. As such, on the basis of the first patch 401 recorded on the medium 30 by the second distance control, the control unit 11 can obtain the correction amount (fifth correction amount) for correcting the displacement of the bidirectional recording of the case where the bidirectional recording is executed with the PG=the second distance.

Further, when performing the recording based on the recording data arbitrarily selected by the user by setting the PG to the third distance different from the first distance and the second distance, the control unit 11 controls the recording based on the first patch 401 formed by the first distance control and the first patch 401 formed by the second distance control. The control of the recording based on the first patch 401 formed by the first distance control and the first patch 401 formed by the second distance control means the control of the recording based on the fourth correction amount and the fifth correction amount. More specifically, on the basis of the relationship of the size, ratio and the like between the first distance, the second distance and the third distance, the control unit 11 calculates the correction amount (sixth correction amount) for correcting the displacement of the bidirectional recording of the case where the bidirectional recording is executed with the PG=the third distance through a predetermined interpolation computation from the fourth correction amount and the fifth correction amount. Then, when performing the recording based on the recording data by causing the PG adjusting unit 20 to set the PG to the third distance, the control unit 11 need only correct the timing of at least one of the ink ejection through the forward scanning and the ink ejection through the backward scanning in accordance with the sixth correction amount as described for step S120. With such a configuration, the control unit 11 can obtain high-quality recording results in which the displacement due to the bidirectional recording that is caused at the set PG is corrected, regardless of the set PG for executing the recording.

Further, as is common to the third modification and the fourth modification, the control unit 11 can perform the recording for the second patch 402, the third patch 403, the fourth patch 404 and the fifth patch 405 under conditions of different movement speeds and different PGs such as the first speed, the second speed, the first distance, and the second distance also in the second control and the third control. Then, it suffices to acquire the correction amount for correcting the displacement corresponding to the tilt such as bow corresponding to the third speed and the correction amount for correcting the displacement corresponding to the tilt such as bow corresponding to the third distance through the interpolation computation of the correction amount described above, so as to execute the displacement correction in accordance with the acquired correction amount when performing the recording under a condition of the third speed and/or the third distance.

What is claimed is:

1. A recording apparatus comprising:

a recording head including a nozzle row in which a plurality of nozzles for ejecting ink to a medium are disposed side by side in a nozzle row direction; and a control unit configured to control ink ejection of the recording head, wherein the recording apparatus performs recording on the medium by a conveyance operation of relatively moving the recording head and the medium in a first direction, forward scanning that is ink ejection along with a forward movement of the recording head along a second direction intersecting the first direction, and backward scanning that is ink ejection along with a backward movement of the recording head along the second direction, the nozzle row includes, along the nozzle row direction, a first nozzle group, a second nozzle group, and a third nozzle group between the first nozzle group and the second nozzle group, the control unit is configured to control, in the forward scanning, formation of a first pattern on the medium through ink ejection from the first nozzle group, and formation of a second pattern on the medium through ink ejection from the second nozzle group, the control unit is configured to control, in the backward scanning, formation of a third pattern on the medium through ink ejection from the first nozzle group, and formation of a fourth pattern on the medium through ink ejection from the second nozzle group, the control unit is configured to execute:

a first control of forming a first patch on the medium without performing a conveyance operation, the first patch being a patch in which the first pattern and the third pattern are disposed at overlapping positions as viewed in the second direction, a second control of forming a second patch and a third patch on the medium, the second patch being a patch in which the first pattern and the second pattern are disposed at overlapping positions as viewed in the second direction, the third patch being a patch in which the third pattern and the fourth pattern are disposed at overlapping positions as viewed in the second direction, and a third control of forming a fourth patch and a fifth patch on the medium, the fourth patch being a patch in which the first pattern and the fourth pattern are disposed at overlapping positions as viewed in the second direction, the fifth patch being a patch in which the second pattern and the third pattern are disposed at overlapping positions as viewed in the second direction, and the first control and the second control, or the first control and the third control are executed by a single adjusting operation.

2. The recording apparatus according to claim 1, wherein in each of the first control and the second control, or in each of the first control and the third control, the control unit forms a plurality of the patches in which relative positions of a plurality of the patterns making up the patch in the second direction are different.

3. The recording apparatus according to claim 1, wherein when performing recording in an overlapping region that is a target of the ink ejection from the first nozzle group and the ink ejection from the second nozzle group, the control unit corrects timing of at least one of the ink ejection from the first nozzle group and ink ejection from the second nozzle group in accordance with relative positions of the patterns making up the patch in the second direction.

4. The recording apparatus according to claim 1, wherein the control unit executes, in the first control, a first speed control of forming the first patch by setting a movement speed of the recording head along the second direction to a first speed, the control unit further executes, in the first control, a second speed control of forming the first patch by setting the movement speed to a second speed different from the first speed, and when performing recording by setting the movement speed to a third speed different from the first speed and the second speed, the control unit controls the recording based on the first patch formed by the first speed control and the first patch formed by the second speed control.

5. The recording apparatus according to claim 1, wherein the control unit executes, in the first control, a first distance control of forming the first patch by setting a distance between the medium and the recording head to a first distance, the control unit further executes, in the first control, a second distance control of forming the first patch by setting the distance to a second distance different from the first distance, and when performing recording by setting the distance to a third distance different from the first distance and the second distance, the control unit controls the recording based on the first patch formed by the first distance control and the first patch formed by the second distance control.

6. The recording apparatus according to claim 1, wherein when executing the first control and the second control, the control unit forms the first pattern for making up the first patch and the second pattern for making up the second patch, on the medium by the same forward scanning.

7. A recording method of performing recording on a medium by a conveyance operation of relatively moving a recording head and the medium in a first direction, forward scanning that is ink ejection along with a forward movement of the recording head along a second direction intersecting the first direction, and backward scanning that is ink ejection along with a backward movement of the recording head along the second direction, the recording head including a nozzle row in which a plurality of nozzles for ejecting ink to the medium are disposed side by side in a nozzle row direction, wherein the nozzle row includes, along the nozzle row direction, a first nozzle group, a second nozzle group, and a third nozzle group between the first nozzle group and the second nozzle group, and a first control and a second control, or the first control and a third control are executed by a single adjusting operation, provided that a pattern that is formed on the medium through ink ejection from the first nozzle group in the forward scanning is a first pattern, a pattern that is formed on the medium through ink ejection from the second nozzle group in the forward scanning is a second pattern, a pattern that is formed on the medium through the ink ejection from the first nozzle group in the backward scanning is a third pattern, and a pattern that is formed on the medium through the ink ejection from the second nozzle group in the backward scanning is a fourth pattern; and a control of forming a first patch on the medium without performing the conveyance operation is the first control, the first patch being a patch in which the first pattern and the third pattern are disposed at overlapping positions as viewed in the second direction, a control of forming a second patch and a third patch on the medium is the second control, the second patch being a patch in which the first pattern and the second pattern are disposed at overlapping positions as viewed in the second direction, the third patch being a patch in which the third pattern and the fourth pattern are disposed at overlapping positions as viewed in the second direction, and a control of forming a fourth patch and a fifth patch on the medium is the third control, the fourth patch being a patch in which the first pattern and the fourth pattern are disposed at overlapping positions as viewed in the second direction, the fifth patch being a patch in which the second pattern and the third pattern are disposed at overlapping positions as viewed in the second direction.

* * * * *